United States Patent [19]

Komori et al.

[11] 4,017,173

[45] Apr. 12, 1977

[54] COPYING APPARATUS FOR COPYING A PLURALITY OF ORIGINAL SURFACES WITH A SINGLE SCAN

[75] Inventors: Shigehiro Komori; Hisashi Sakamaki, both of Yokohama; Masao Ariga, Chofu; Hiroshi Nitanda; Seigi Nagasawa, both of Tokyo, all of Japan

[73] Assignee: Canon Kabushiki Kaisha, Tokyo, Japan

[22] Filed: Dec. 31, 1974

[21] Appl. No.: 537,641

[30] Foreign Application Priority Data

Jan. 11, 1974 Japan .............................. 49-6459
June 7, 1974 Japan ............................ 49-65253

[52] U.S. Cl. ................................... 355/8; 355/11; 355/26
[51] Int. Cl.² .................................. G03G 15/28
[58] Field of Search ................. 355/3 R, 8, 11, 14, 355/23–26, 82; 271/9, DIG. 9, 163

[56] References Cited

UNITED STATES PATENTS

| | | | |
|---|---|---|---|
| 3,630,607 | 12/1971 | Korn et al. | 355/14 X |
| 3,635,555 | 1/1972 | Kurahashi et al. | 355/8 |
| 3,645,615 | 2/1972 | Spear | 355/3 R |
| 3,856,295 | 12/1974 | Looney | 355/3 R X |
| 3,869,202 | 3/1975 | Tabata et al. | 355/3 R |
| 3,876,302 | 4/1975 | Todt | 355/8 X |

Primary Examiner—R. L. Moses
Attorney, Agent, or Firm—Fitzpatrick, Cella, Harper & Scinto

[57] ABSTRACT

A copying apparatus having an original carriage capable of carrying thereon an original dimensionally corresponding to the combined area of two surfaces of a desired copy size is improved so that originals carried on the two surfaces at a time can be separately copied one by one.

13 Claims, 35 Drawing Figures

FIG. 4
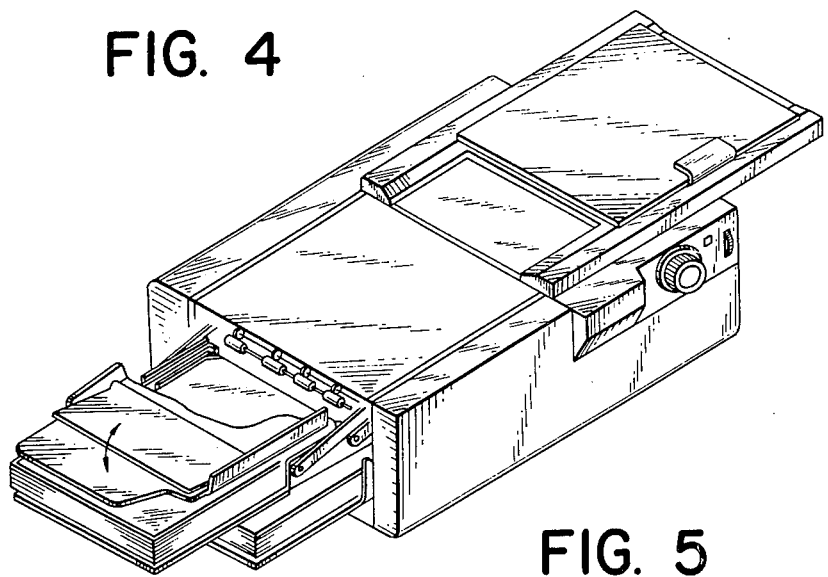
FIG. 5
(a)
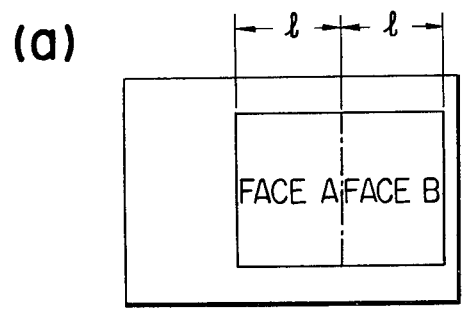
(b)
FIG. 6
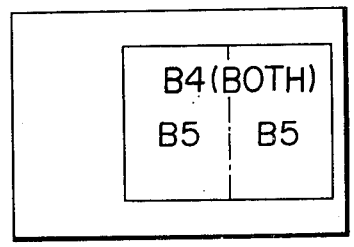

FIG. 12
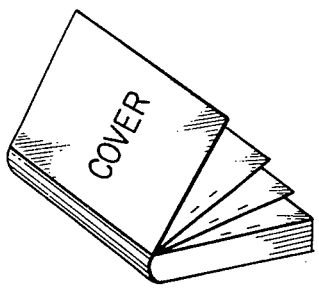
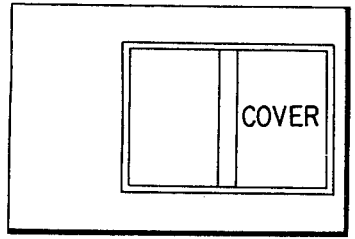
BOUND AT LEFT SIDE
FIG. 13
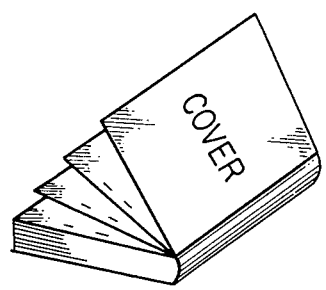
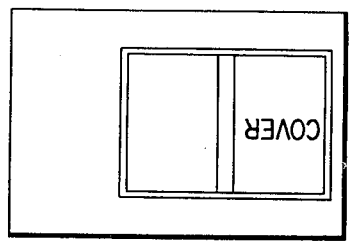
BOUND AT RIGHT SIDE
FIG. 14
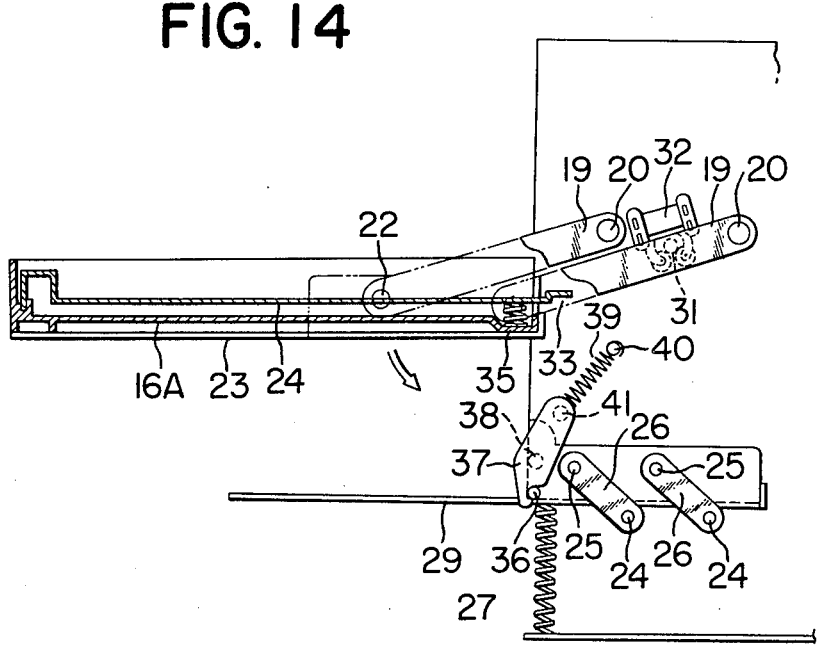

FIG. 26
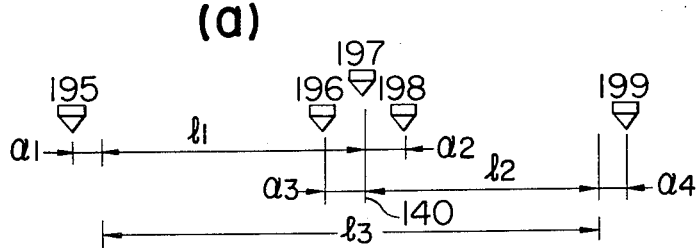
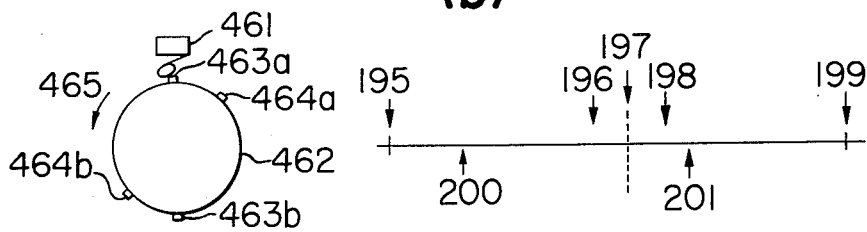
FIG. 27
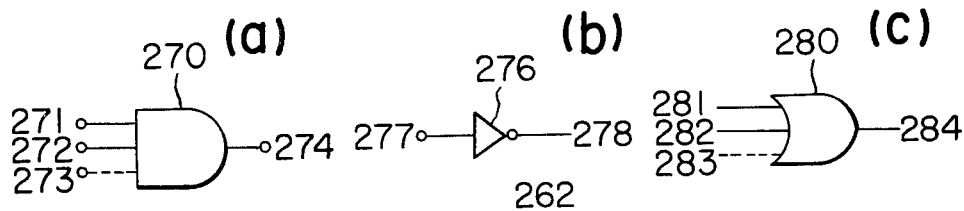
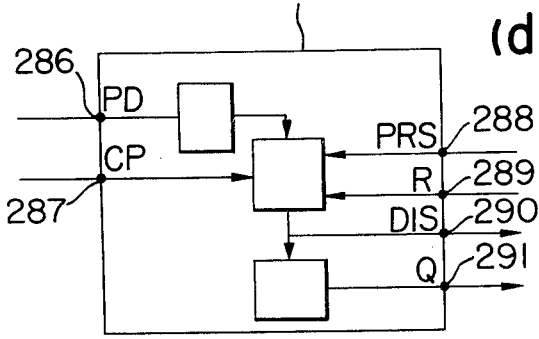

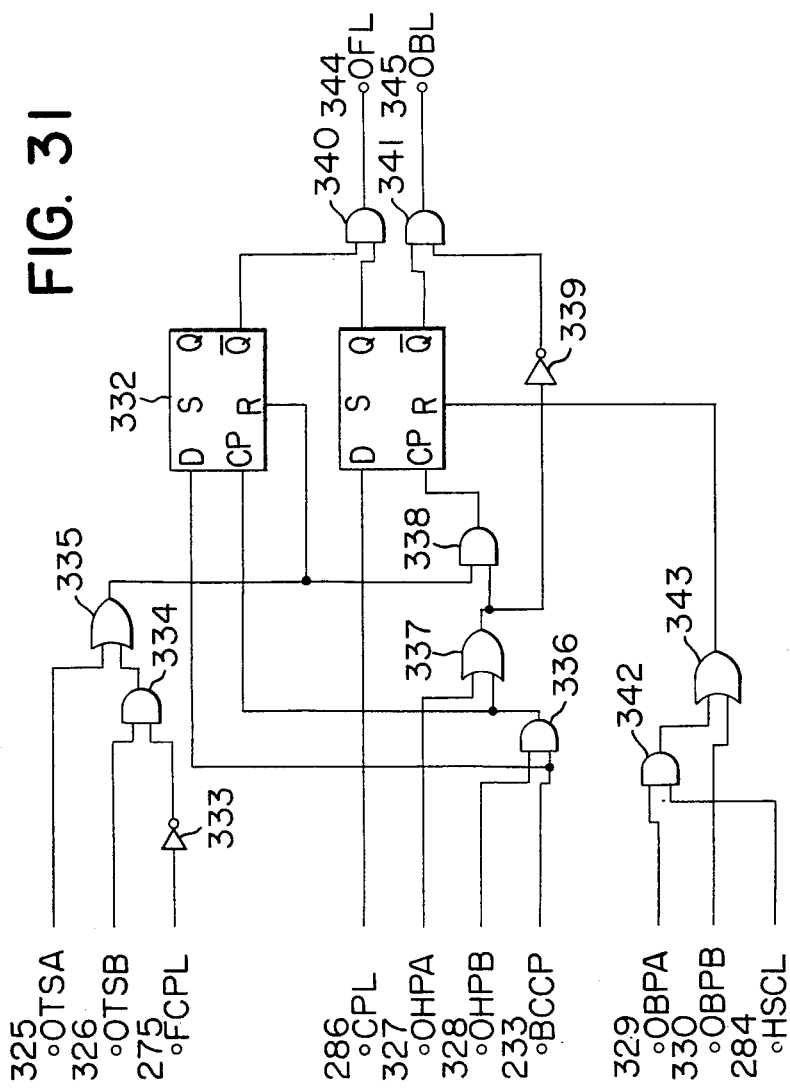
FIG. 31
FIG. 32

COPYING APPARATUS FOR COPYING A PLURALITY OF ORIGINAL SURFACES WITH A SINGLE SCAN

BACKGROUND OF THE INVENTION

1. Field of the Invention

This invention relates to a copying apparatus, and more particularly to a copying apparatus which is capable of copying on both sides of a copy medium.

2. Description of the Prior Art

Heretofore, copying has usually been effected on one side of each copy medium. One-side copies quantitatively double both-side printed matter such as books or the like, and huge quantities of one-side copies cause storage and weight problems. Also, the recent trend to save materials and man power and to reduce the cost of copying has increased the need for copying machines which can effect copying on both sides of each medium.

There are copying machines of the transfer type which can perform copying on both sides of a copy medium. In these machines, conventional copying (including transfer and fixation) is first effected on one side of a copy paper, whereafter the same copy paper is directed back to the initial paper feed position or to a second paper feed means, from which the copy paper disposed upside down is introduced into the apparatus so that copying may be effected on the back side of the copy paper in the same way as is done on said one side. Such a system may be said to be practical in that it requires only one set of similar copying processes which leads to low cost and compactness of the copying machine.

When copying on both sides of a sheet of copy paper is desired, use may be made of an original carriage having an original supporting surface corresponding in dimensions to the combined area of two surfaces of one copy size in order to copy originals corresponding to both sides of a copy paper. In such case, two different originals may be placed on the original carriage at a time and copied alternately. This means a corresponding economy of the procedure for placement of originals on the original carriage (see FIG. 5 of the accompanying drawings).

Such case could be classified into the following two types.

1. Cases where the two originals to be copied on both sides of copy paper are separable and can be separately placed on the original carriage at a time.

2. Cases where the two originals to be copied on both sides of copy paper are not separable such as the opposite pages on a leaf of a book or the like and which cannot be placed on the original carriage at the same time.

Even in cases (2) above, if it is desired to copy a series of pages of a book (as would most usually be the case), the book may be opened and placed on the original carriage with the opened pages facing the respective original supporting surfaces of the carriage, and then copying may be carried out in the following sequence, for example:

In a first copy cycle, copying is effected on the back side of a first sheet of copy paper;

In a second copy cycle, copying is effected on the face of a second sheet of copy paper;

A leaf of the book is then turned over;

In a third copy cycle, copying is effected on the back side of the second sheet of copy paper;

In a fourth copy cycle, copying is effected on the face of a third sheet of copy paper;

A further leaf of the book is then turned over;

In a fifth copy cycle, copying is effected on the back side of the third sheet of copy paper;

and so forth. (See FIG. 5.)

Thus, in this case, two original surfaces placed on the original carriage are copied not on the opposite sides of the same copy sheet but on one side of a first copy sheet and the other side of a second copy sheet, respectively. In this case, however, it still holds true that the two original surfaces to be copied are placed on the original carriage at the same time.

SUMMARY OF THE INVENTION

It is a general object of the present invention to provide a copying apparatus which has an original supporting surface dimensioned to cover the combined area of two original surfaces of a copy size, and which is highly effective and conveniently operable for production of both-side copies.

According to the present invention, there is provided a copying apparatus which has an original carriage capable of carrying thereon an original corresponding in dimensions to the combined area of two surfaces of a desired copy size and which is improved so that originals carried on the two surfaces at a time can be separately copied one by one, and more particularly to a copying apparatus of the described type wherein the original carriage is divided into two surface portions, one of which is used as original supporting surface for face-copy and the other as original supporting surface for back-side copy, the cycle of face-copy is associated with preparation means for back-side copy, and one cycle of back-side copy is associated with discharge means for discharging copy medium out of the apparatus after completion of copying.

Other objects and features of the present invention will become fully apparent from the following detailed description of some embodiments of the invention taken in conjunction with the accompanying drawings.

BRIEF DESCRIPTION OF THE DRAWINGS

FIG. 4 is a perspective view of the apparatus shown in FIG. 1.

FIGS. 5 and 6 illustrate the original carriage of the apparatus.

FIGS. 12 and 13 illustrate the manner in which a book is set on the original carriage.

FIGS. 14 to 16 are enlarged views illustrating the correlation between movements of stack tables.

FIG. 26 illustrates the control system for controlling the position of the optical system and the paper feed.

FIG. 27 shows some examples of the digital logic circuit used in the apparatus of the present invention.

FIG. 31 is a diagram of the control circuit for controlling movement of the optical system.

FIG. 32 is a diagram of the circuit for rotatively driving the photosensitive drum.

DESCRIPTION OF THE PREFERRED EMBODIMENTS

Figure 1:
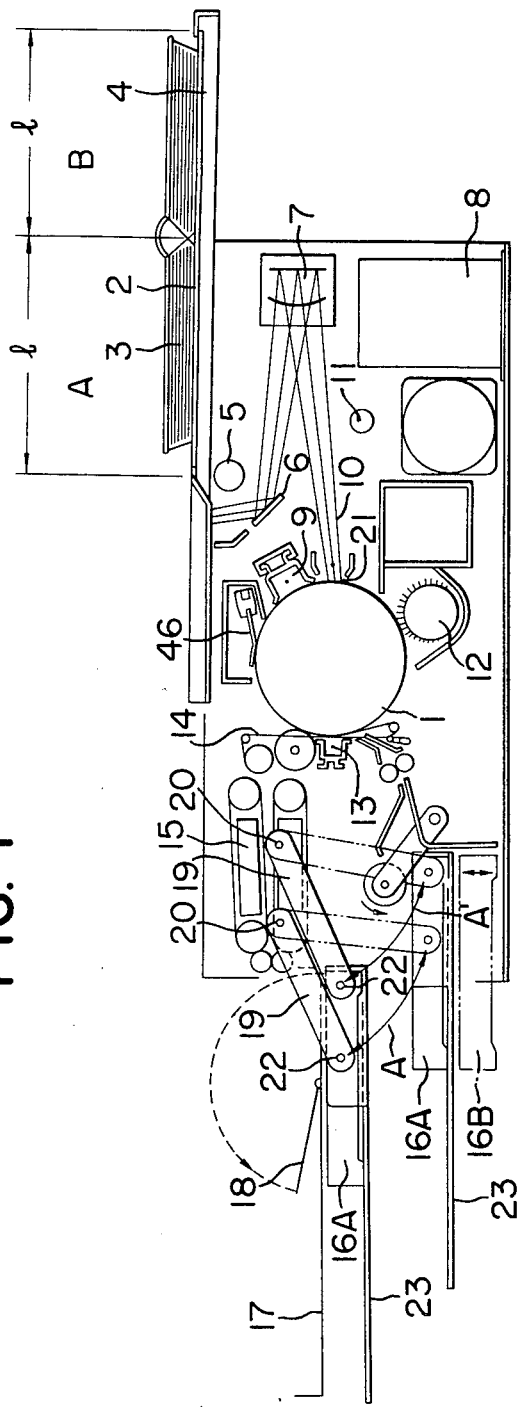
FIG. 1 is a longitudinal section of a copying apparatus to which the present invention is applicable.

To make the present invention clearly understood, some embodiments thereof will be described hereinafter. A first embodiment is an electronic copying apparatus of the transfer type, and especially one which employs a movable original carriage and enables thick or three-dimensional originals to be copied with ease.

Operation of the copying apparatus will be described with reference to FIG. 1. When a rotatable photosensitive drum 1 has rotated to a predetermined position, an original carriage or carrier 4 with an original 3 resting on a carriage glass plate 2 begins to be moved and illuminated from therebelow by an illuminating lamp 5. The image of the original is directed via a mirror 6 and an in-mirror lens 7 so as to be focused on the photosensitive drum 1 in exposure station 21.

The photosensitive drum 1 comprises a photosensitive medium having a photosensitive layer covered with a transparent insulating layer, and is first charged with positive polarity by a corona discharger 9 which is supplied with a positive high voltage from a high voltage source 8. Subsequently, when the photosensitive drym reaches the exposure station, it is slit-exposed to the optical image from illuminating station 5 while, at the same time, it is deelectricfied by a corona discharger 10 which is supplied with an AC high voltage from the high voltage source 8. Next, the drum is subjected to overall exposure by an overall exposure lamp 11 to form an electrostatic latent image on the surface thereof, and then moved to a developing device 12. The electrostatic latent image formed on the drum 1 is developed into a visible image by powder development technique of the sleeve type.

Next, a sheet of transfer paper is fed from a paper feed station and brought into intimate contact with the drum 1, so that the image on the drum 1 is transferred onto the transfer paper by transfer means 13.

After the image transfer has been completed, the transfer paper is separated from the drum 1 by a separator belt 14 and directed to fixing station 15. The drum 1 is cleaned by a blade 46 urged thereagainst to remove any residual developer from the drum, in preparation for another copying cycle.

On the other hand, sheets of transfer paper are contained in cassettes 16A and 16B which are removably mounted in the paper feed station located in the leftward and lower portion of the apparatus body, as viewed in FIG. 1.

Features of the present invention will be discussed on the basis of the above-described copying apparatus. The present invention is concerned with a copying apparatus which can easily effect copying on both sides of transfer paper.

Figure 2:
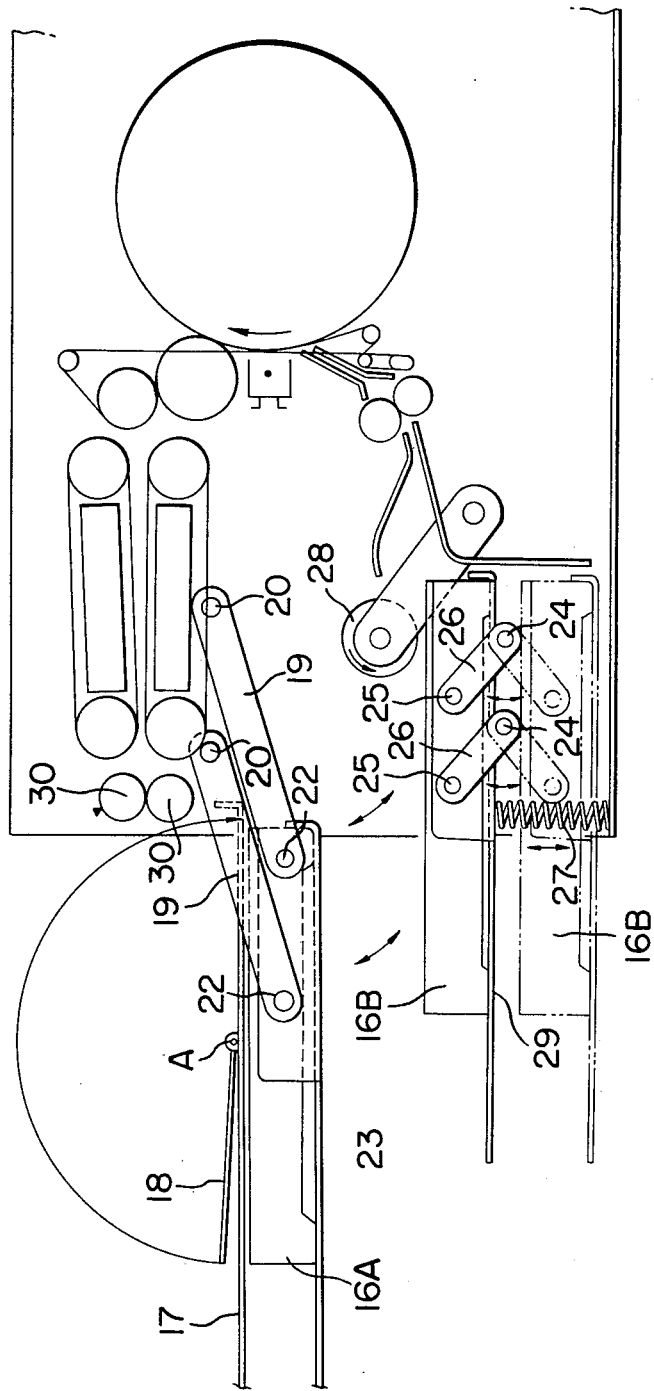
FIGS. 2 and 3 are enlarged views of the tray-cassette portion and illustrating the operation thereof.
Figure 3:
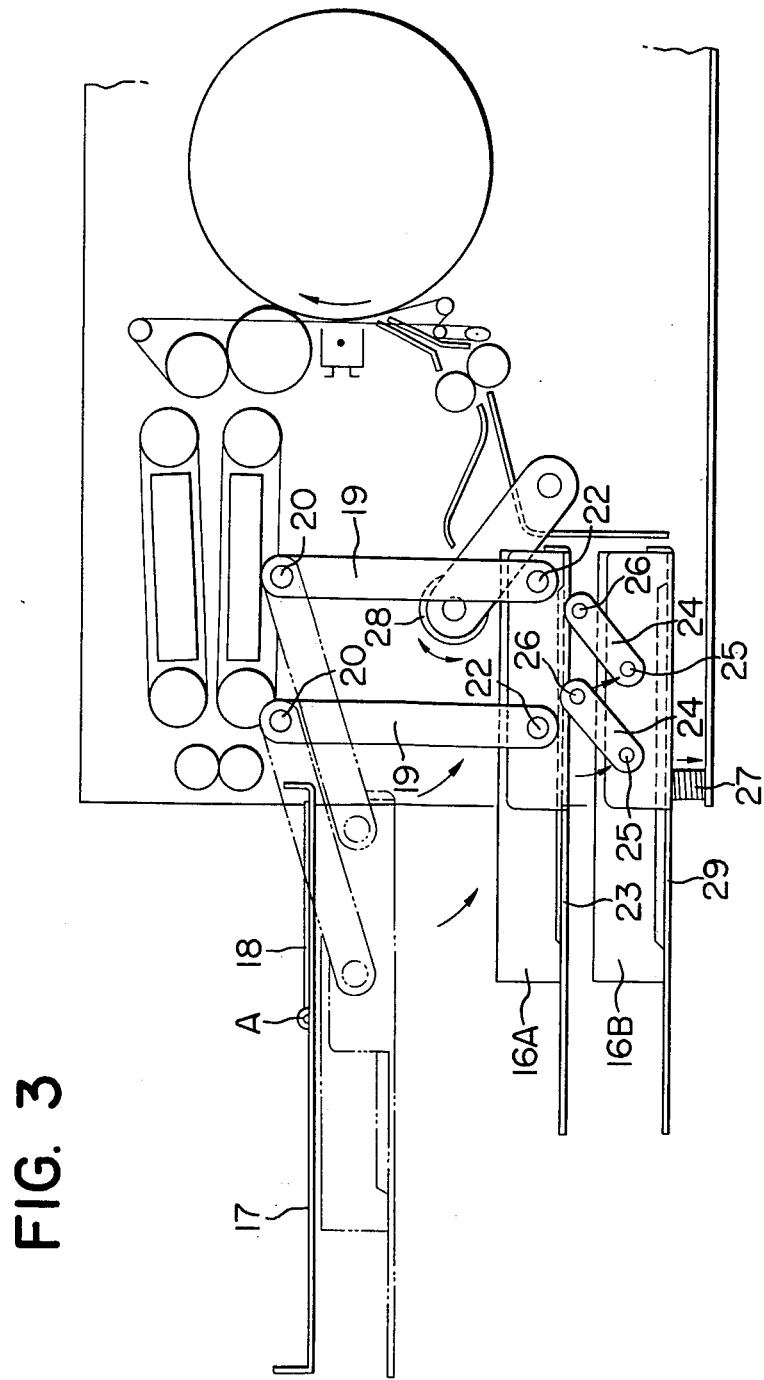

Referring to FIG. 2, a stack table includes a cassette 16B for containing therein sheets of transfer paper and a cassette stack table 29, and the cassette 16B may be set on top of the cassette stack table 29. Pivotable arms 26 are pivotable about pivot shafts 25. These pivotable arms 26 are also pivotably mounted on pivot shafts 24 on the apparatus body, and the cassette stack table 29 is pivotable about the pivot shafts 24 to readily move between its normal position during coping operation and its displaced position as shown in FIG. 3. On the other hand, in FIG. 3, the cassette 16A is set on top of a cassette stack table 23 and pivotable arms 19 are pivotable about pivot pins 22 on the cassette stack table 23. These pivotable arms 19 are also pivotably mounted on pivot pins 20 on the apparatus body, and the cassette stack tble 23 is pivotable about the pivot pins 20 to readily move between its normal position during copying operation and its displaced position as shown in FIG. 2 where the cassette stack table 23 lies just below the discharge tray 17. The operative association between the cassettes 16A and 16B will now be considered. In FIG. 2, the cassette 16B is set to a position where the cassette stack table 29 is in its normal position. When both-side copy is to be done in such position, the cassette stack table 23 is set to a location proximate to the discharge tray 17 so that the cassette 16A may serve as a tray for receiving transfer paper when transfer paper fed from the cassette 16B is discharged through discharge rollers 30 after image transfer. At this time, the tray originally intended as such is in the position as indicated in FIG. 2 where a plate 18 is pivoted about its pivot A to open a portion of that tray to permit the cassette 16A to serve as the tray for receiving the transfer paper discharged through the discharge rollers after image transfer. Subsequently, the cassette 16A is brought to its paper feed position by the cassette stack table 23 being pivoted about the pivots 20, as shown in FIG. 3. At this time, the cassette 16B is pivoted about the pivots 24 from its paper feed position of FIG. 2 to the position of FIG. 3 deviated from the paper feed position. At this point of time, the plate 18 forming a part of the tray 17 is returned to its original position (FIG. 3) and, when copying is resumed, copy image will now be produced on the back side of the transfer paper which is opposite to that side on which image transfer has previously been effected, and the transfer paper will be discharged through the discharge rollers onto the tray 17, thus completing both-side copy.

When it is desired to use the cassette 16B, the cassette stack table 29 for the cassette 16B may be automatically returned to its paper feed position shown in FIG. 2 by bringing the cassette stack table 23 for the cassette 16A to the position shown in FIG. 2. Moreover, ordinary one-side copy may be accomplished very naturally by bringing the plate 18 back to the position as shown in FIG. 3.

FIG. 14 illustrates the manner in which the cassette stack table 29 for the cassette 16B is moved from the position of FIG. 2 to the position of FIG. 3 in response to pivotal movement of the cassette stack table 23 for the cassette 16A from the position of FIG. 2 to the position of FIG. 3.

In FIG. 14, the cassette stack table 29 is in its paper feed position and a dowel 36 mounted on the cassette stack table 29 is locked by a lock lever 37. The lock lever 37 is pivotable about the pivot pin 39 mounted on the main body and has an unlocking pin 41 secured thereto. The lock lever 37 is biased by a spring 39 having one end secured to the unlocking pin 41 of the lock lever 37 and the other end secured to a hook 40 fixed to the main body.

On the other hand, the cassette stack table 23 is placed adjacent the discharge tray portion, and a roller catcher 32 mounted to the main body embraces a dowel 31 fixed to the pivotable arm 19 to fix the table 23 to the tray portion.

Figure 15:
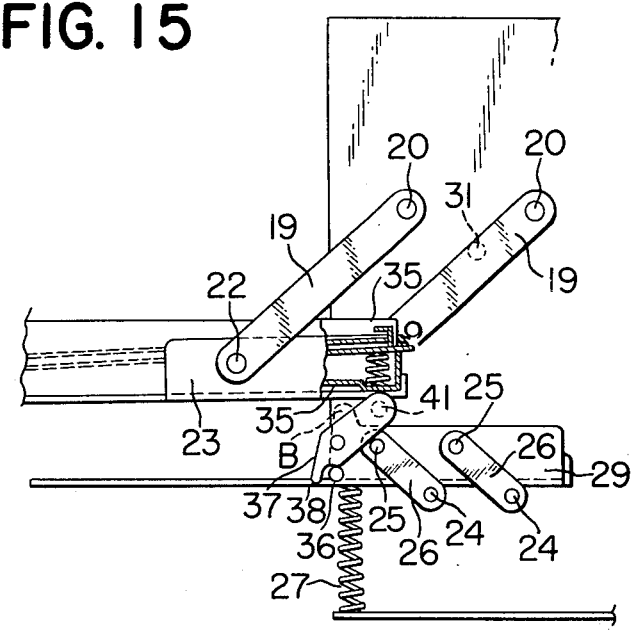
Figure 16:
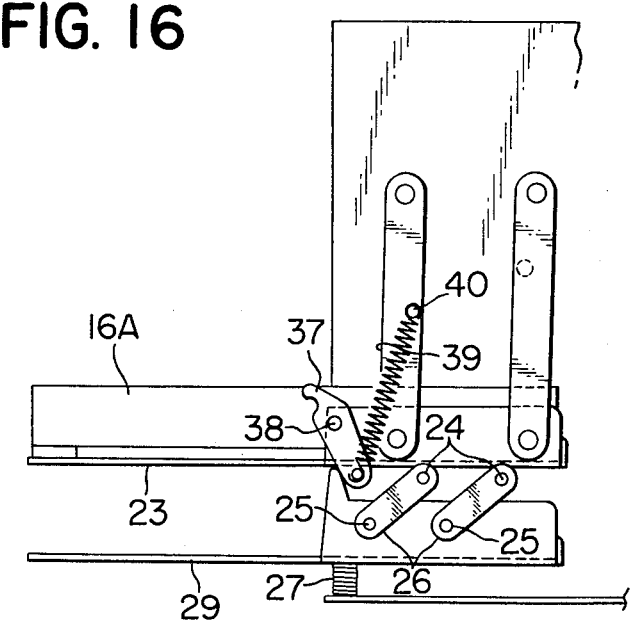

As the operator depresses the cassette stack table 23 in the direction of arrow, the dowel 31 is disengaged from the roller catcher 32 to permit the cassette stack table 23 to be lowered to its position as shown in FIG. 15. Then, a lower portion of the stack table 23 strikes against the unlocking pin 41 mounted to the lock lever 37 to disengage the lock lever 37 from the dowel 36 to bring the cassette stack table 29 to a position in which it is only biased upwardly by the spring 27. Subsequently, the projected portion B of the cassette stack table 29 is depressed by the lower portion of the cassette stack table 23, which thus comes to its paper feed position as shown in FIG. 16. When the cassette stack table 23 is to be brought back to the tray position, operation converse to what has been described above will occur to cause the cassette stack table 29 to be locked by the lock lever 37 and cause the roller catcher 32 to embrace the dowel 31, whereby the cassette stack table 23 is also locked in the tray position.

The cassette 16A will now be explained. The cassette 16A is raised upwardly by an intermediate plate 34 supporting thereon sheets of transfer paper and by a spring 35 biasing the intermediate plate upwardly, to such an extent that the transfer paper on the intermediate plate strikes against a pawl 49. By the use of such cassette, the uppermost sheet of transfer paper is always maintained at a predetermined level so that accurate feed is ensured when the paper feed roller 28 is lowered only during paper feeding, as shown in FIG. 2.

Figure 17:
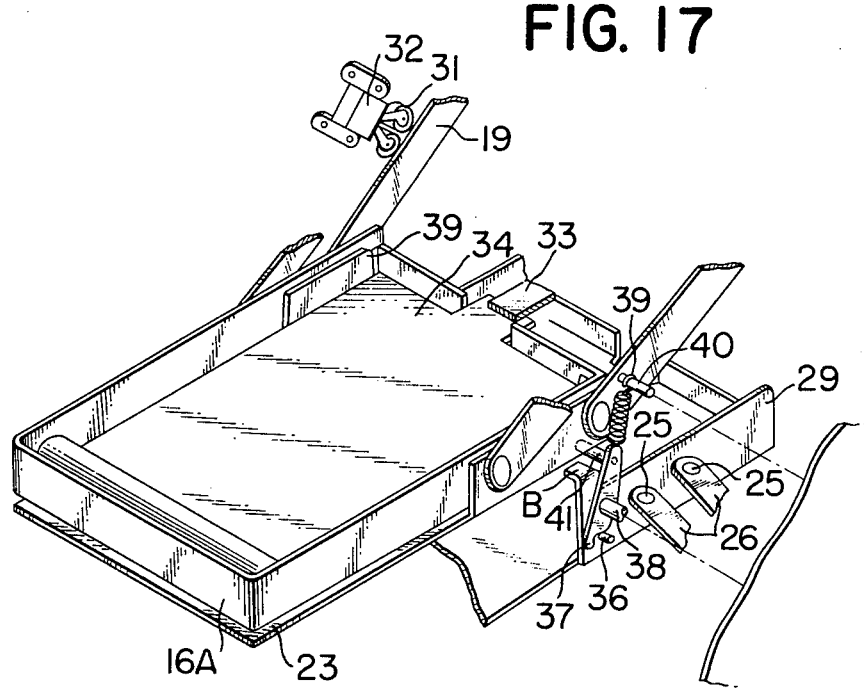
FIG. 17 illustrates the control of the intermediate plate of the stack tables.

By that time this cassette comes to the tray portion as shown in FIG. 14, the intermediate plate 34 must have been depressed to permit the transfer paper discharged through the discharge portion to be received in that cassette. For this reason, a portion of the intermediate plate 34 is formed as a projection, as shown in FIG. 17, to thereby enable a portion of the intermediate plate 34 to be depressed by a stop 33 on the main body when the cassette stack table 23 comes near the tray portion. Thus, in the position as shown in FIG. 15 where the intermediate plate 34 is freed from the stop 33, the sheets of transfer paper within the cassette is raised by the intermediate plate with the uppermost sheet of transfer paper striking against the pawl 49 and ready to be fed.

Figure 7:
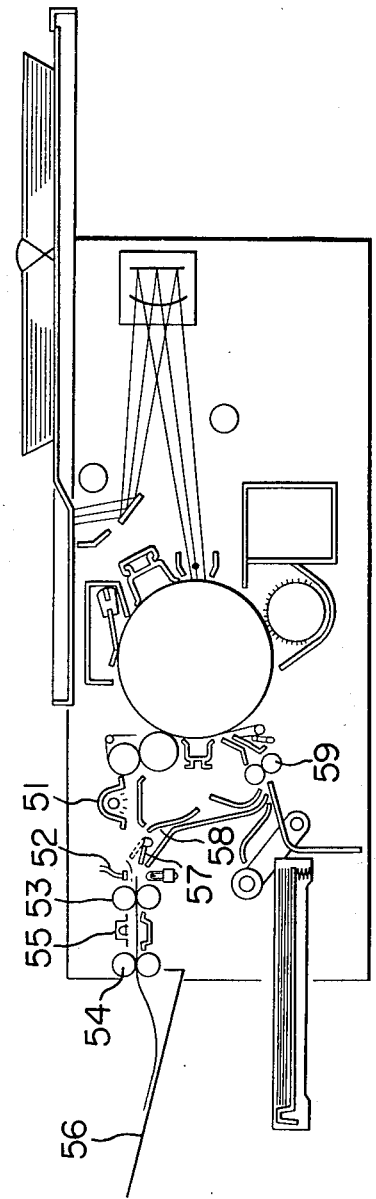
FIG. 7 is a longitudinal section of a copying apparatus to which an embodiment of the present invention is applied.

FIG. 7 shows another embodiment of the present invention. In this embodiment, the paper discharge portion of the previous embodiment is modified such that copy paper with one-side copy completed thereon is not discharged out of the apparatus but is again directed into the apparatus for back-side copy.

The copy paper which, during one-side copy, is passed through a fixing device 51 and transported by paper discharge rollers 53 and 54 while having any excess charge removed by a deelectrifier 55, is detected by a light-sensing element 52 when the trailing end of the copy paper passes such element, whereupon the paper discharge rollers 53 and 54 are reversed in rotation to direct the copy paper into a passage 58 for back-side copy. Simultaneously with the reversed rotation of the discharge rollers 53 and 54, a guide plate 57 is displaced to its position for guiding the copy paper to the passage 58, and the copy paper comes to a halt near register rollers 59.

Subsequently, for back-side copy, the copy paper is again fed into the apparatus by a paper feed signal and under the control of the register rollers 59.

After completion of the image transfer, the copy paper is passed through the fixing device 51 and the deelectrifier 55 and discharged onto a tray 56 by the paper discharge rollers 53 and 54.

A feature of the present embodiment, unlike the previous embodiment, is that both-side copy can be easily effected on each sheet of copy paper and that one-side copy is automatically followed by back-side copy.

Features of the invention will more particularly be described with respect to the present embodiment. As seen in FIG. 6, the original carriage of the present apparatus is of a sufficient size to cover size B4. As an example, the case where a book of size B5 is to be copied on both sides of copy paper of size B5 will be discussed hereinafter.

The original supporting surface of the carriage is divided into face A and face B (each being size B5) so as to permit two surfaces of size B to be placed on the original carriage at a time.

Figure 8:
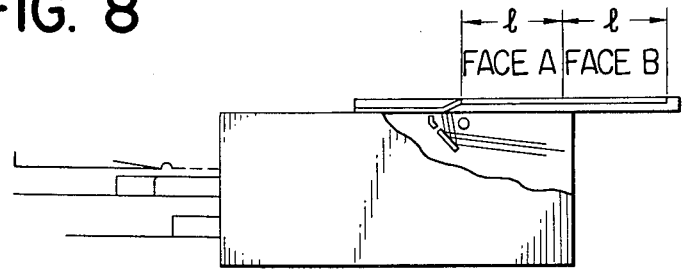
FIGS. 8 to 11 illustrate the operation of the original carriage.

Face-A copying will first be described by reference to FIGS. 8-9.

The face A of the original carriage is located just in front of the slit of the illuminating portion as in conventional copying machine. The original carriage is started by a start signal controlled by rotation of the photosensitive drum and enters into face-A exposure stroke. When such exposure is completed, the original carriage comes to a halt.

Figure 10:
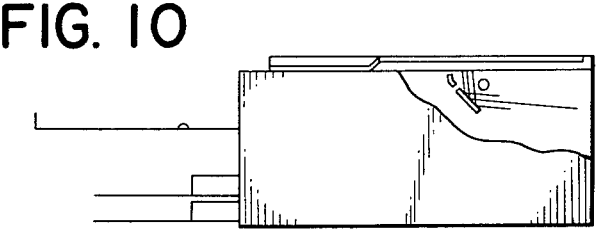
Figure 11:
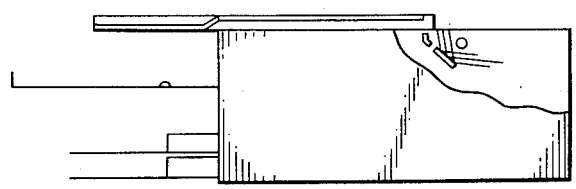

Face-B copying will now be described by reference to FIGS. 10-11.

The face B of the original carriage is located just in front of the slit of the illuminating portion and, when face-B exposure stroke is completed, the original carriage comes to a halt, as in the face-A copying.

Figure 9:
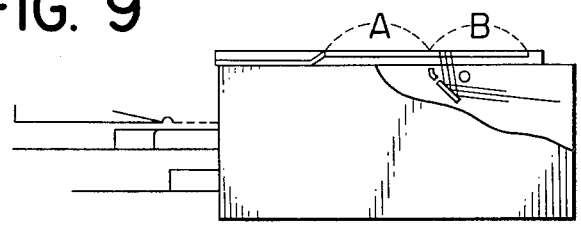

The length of the face-A exposure stroke (as well as that of the face-B exposure stroke) is the length 1 of the face A plus the width of the slit and some allowances for starting and stopping movements, and thus the stop position is such as shown in FIG. 9. Therefore, when the face-A copying has been completed and is to be followed by the face-B copying, the original carriage must be moved back so that it is adjusted to its face-B copying start position (shown in FIG. 10).

Likewise, when the face-B copying has been completed (see FIG. 11) and is to be followed by the face-A copying, the original carriage must be moved back to its face-A copying start position.

By designating the face A and the face B as the original supporting surface for one-side copy and that for back-side copy, respectively, the following advantages may be added.

The differrence between the face-A copying start position and the face-B copying start position of the original carriage may be utilized to produce a signal to put the following into practice. During face-a copying:

To indicate one-side copy cycle; and

To provide indicator or alarm means so that copy paper may be set to the feed position for back-side copy after completion of one-side copy; or To provide a further automatization so that the copy paper may be set to the feed position for back-side copy after completion of one-side copy.

Describing this with respect to an embodiment, operative association is provided such that microswitch or like means is utilized to detect that the cassette 16 is in the position for receiving one-side printed copy paper and that the plate 18 on the tray 17 is in its open position, and further that no signal for face-A copying is produced when these preparatory positions are not brought about.

In the embodiment shown in FIG. 7, one-side printed copy paper is not discharged through the discharge rollers but is reversed to the feed position for back-side copy. During face-B copying:

To indicate back-side copy cycle; and

To provide an indication or alarm so that copy paper may be discharged onto the tray after completion of the back-side copy, or to provide a further automatization so that the copy paper may be discharged onto the tray.

Thus, operability may be enhanced by varying the indication and the operation of the copying apparatus between face-A copying and face-B copying.

Books are usually bound in two ways, namely, at right side or at left side as shown in FIGS. 12 and 13, but in any case it is usual that the front side of each leaf is odd-numbered while the back side is even-numbered. Therefore, by making it a rule to place a book on the original carriage with an odd-numbered page resting on the face A and an even-numbered page on the face B, both-side copy may be accurately accomplished for any type of book, irrespective of the difference in binding. In this case, as will be seen from FIGS. 12 and 13, the orientation of the book on the carriage is inverted depending on whether the book is bound at right side or at left side. This also leads to an advantage that an operationally convenient indication may be provided by designating the face A and the face B for one-side copy and back-side copy, respectively.

Also, if copying is effected in such a manner that the face-A copying is followed by the face-B copying, namely, one-side copy is followed by back-side copy, then the copy paper after completion of both side copy will be placed on the tray with its back side up and this will convenient in that the discharged final copies are piled in order of page number.

Although the present invention has hitherto been described with respect to an application to the copying apparatus of the reciprocable original carriage type, it is not limited thereto. Further, the present invention is neither restricted to the above-described system of electrostatic latent image formation or the image transfer type, but it is applicable to any other types of copying apparatus including the electrofax type.

A further embodiment of the present invention will now be described in detail. This embodiment is an electronic copying apparatus of the transfer type which adopts a stationary original carriage and can easily copy thick or three-dimensional originals, as well.

Operation of such copying apparatus will be explained by reference to FIG. 18.

An original 63 is placed on a transparent plate 62, and an optical system is formed by movable mirrors 64 and 65, lens 67 and stationary mirrors 68 and 69. The movable mirror 64 is movable with an illuminating lamp 66, and the movable mirror 65 is movable at a velocity half that of the movable mirror 64 and in the same direction as the latter. Thus, the original 63 is scanned by the lamp 66 and mirrors 64 and 65 with the length of the optical path maintained constant by these movable mirrors and the image of the original is projected via the lens 67 and the stationary mirrors 68 and 69 onto a drum 61 through a slit.

The surface of drum 61 comprises a photosensitive medium having a photosensitive layer covered with a transparent insulating layer, and is first charged with positive polarity by a positive charger 71 which is supplied with a positive high voltage from a high voltage source 70. Subsequently, when the photosensitive drum reaches an exposure station 72, the original 63 on the transparent plate 62 of the original carriage is illuminated by the illuminating lamp 66 and the image thereof is focused on the drum 61 by the movable mirrors 64, 65, lens 67 and stationary mirrors 68, 69. As soon as the photosensitive medium is exposed to the original image, it is subjected to AC discharge by an AC discharger 73 which is supplied with a high AC voltage from the high voltage source 70.

Next, the photosensitive drum is subjected to overall exposure by an overall exposure lamp 74 to form an electrostatic latent image on the surface of the drum, and then the drum enters a developing device 75.

The electrostatic latent image is developed into a visible image by the power development technique of the magnetic sleeve type.

Subsequently, a sheet of copy paper 77 fed from a cassette 76 is brought into intimate contact with a drum 61. A transfer charger 78, supplied from the high voltage source 70, charges the copy paper with positive polarity to transfer the image from the drum 61 to the copy paper.

After the image transfer, the copy paper is separated from the drum 61 at a separating station 79 and directed to a fixing station. On the other hand, the drum surface (photosensitive medium) is cleaned by a blade 81 urged thereagainst to remove any residual toner from the drum surface, in preparation for another cycle.

Both-side copy easily accomplished by the present embodiment in accordance with the above-described construction will now be explained. The paper conveying system will first be considered. It is designed such that one-side printed copy paper is not discharged out of the apparatus but is again directed to the transfer device for back-side copy. The copy paper which, during one-side copy, is passed through a fixing device 80 and conveyed through discharge rollers 82 while having any excess charge removed by a deelectrifier 83, is detected by a light-sensing element 84 when the trailing end of the paper passes such element, whereupon the discharge rollers 82 are reversed in rotation to direct the copy paper into a passage 85 for back-side copy. Simultaneously with the reversed rotation for the discharge rollers 82, a guide plate 86 is displaced to its position for guiding the copy paper to the passage 85, and the copy paper is stopped near register rollers 89 by transport rollers 87 and 88.

Subsequently, for back-side copy, the copy paper is again fed into the apparatus by a paper feed signal and under the control of the register rollers 89. After completion of the image transfer, the copy paper is passed through the fixing device 80 and deelectrifier 83 and discharged onto the tray 90 by the discharge rollers 82.

Figure 19:
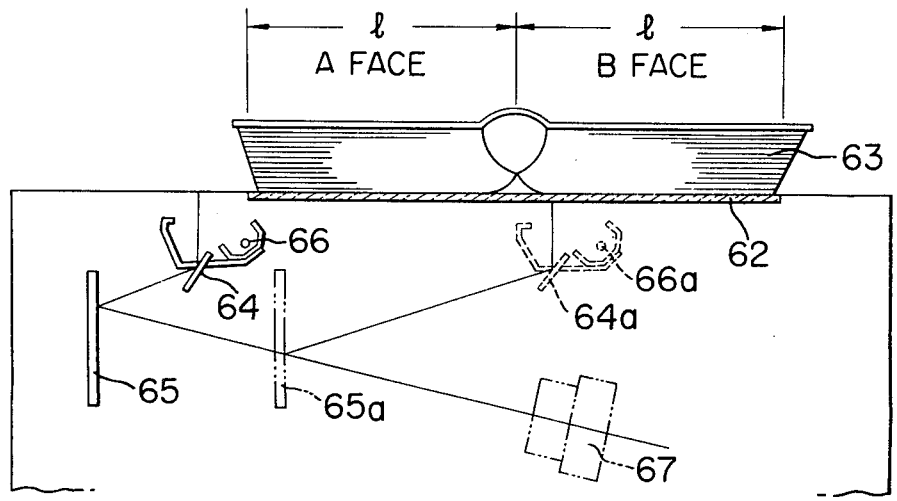
FIGS. 19 and 20 illustrate the relationship of both-side copy with the optical system.
Figure 20:
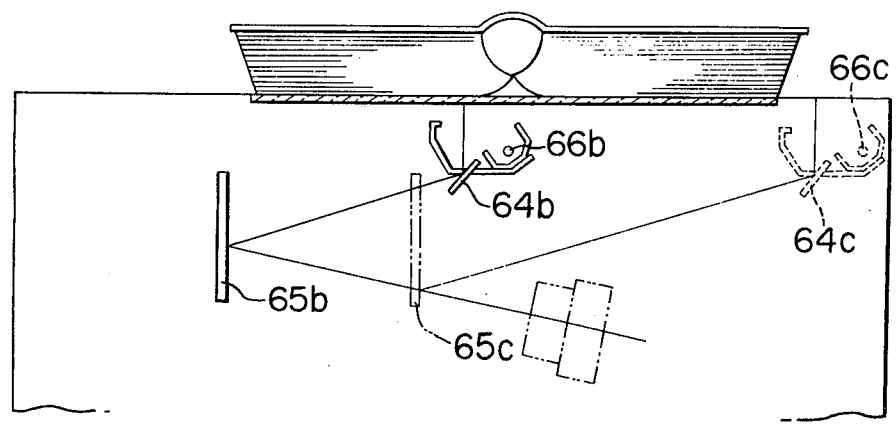

Operation of the optical system during the both-side copy will now be described by reference to FIGS. 19 and 20.

In the present embodiment, the original carriage is of a sufficient size to cover size A3. As an example, the case where a book of size A4 is to be copied on both sides of copy paper will be considered herein.

The original supporting surface is divided into face A and face B (each being size A4) so as to permit two surfaces of size A4 to be placed on the original carriage at a time.

Face-A copying will first be described by reference to FIG. 19. As in conventional copying apparatus, the illuminating portion 66 and mirror 64 of the optical system have their start positions located just in front of the face A of the original carriage, and are started by a start signal controlled by rotation of the photosensitive drum and enters into face-A exposure stroke. When such exposure is completed, the mirror 64 and illuminating portion 66 are stopped at positions 64a and 66a, respectively.

When this occurs, the mirror 65 is also moved to its position 65a.

Face-B copying will be described by reference to FIG. 20. The illuminating portion 66 and mirror 64 have their start positions located just in front of face B of the original carriage, as indicated at 66b and 64b. As in the face-A copying, the optical system is stopped at positions 64c, 65c, 66c when the face-B exposure stroke is completed.

The length of the face-A exposure stroke (as well as that of the face B exposure stroke) is the length $l$ of the face A plus the width of the slit and some allowances for starting and stopping movements. Thus, the stop position of the optical system is such as indicated at 64a, 65a, 66a in FIG. 19.

Therefore, when the face-A copying has been completed and is to be followed by the face-B copying, the optical system 64, 65, 66 must be moved back so that it is adjusted to its face-B copying start position 64b, 65b, 66b.

Figure 18:
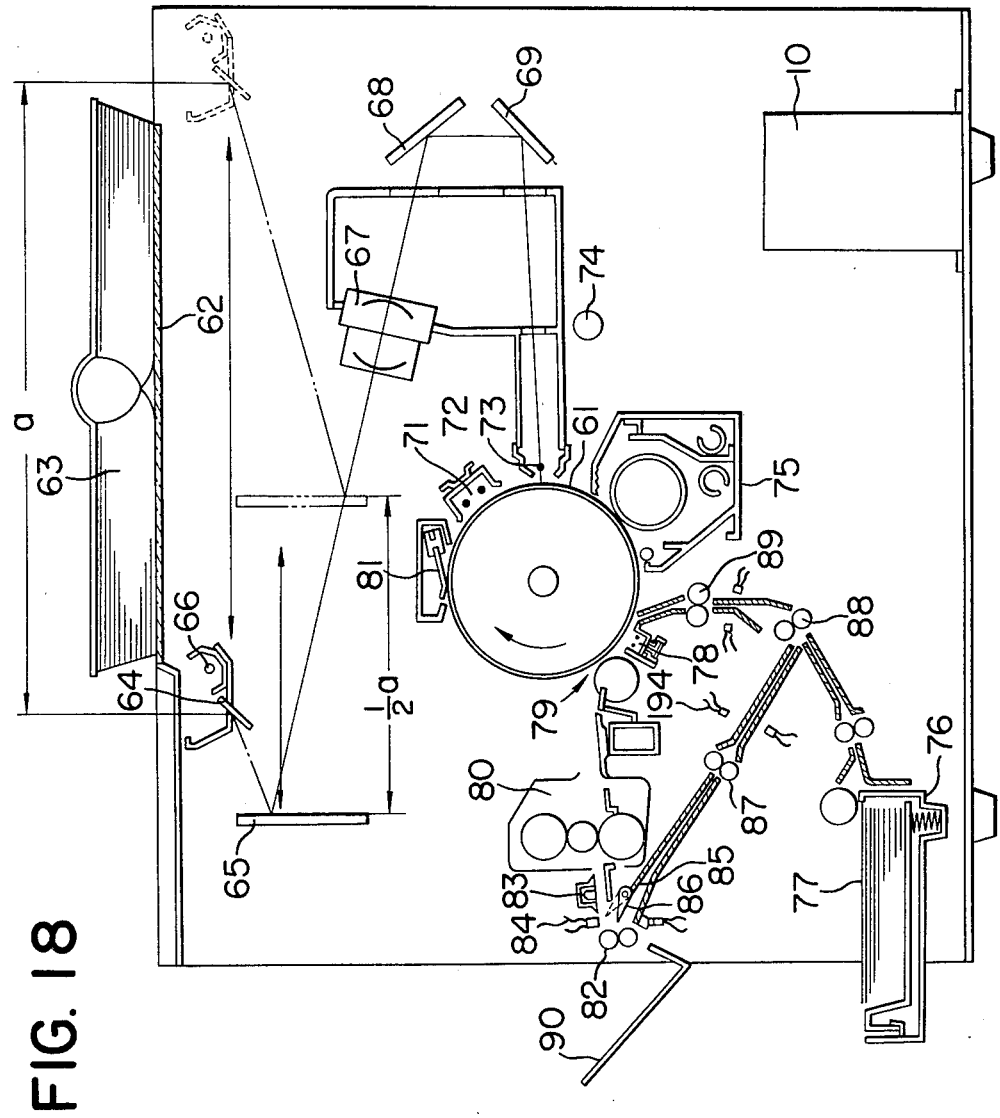
FIG. 18 schematically shows the apparatus according to another embodiment of the present invention.

Likewise, when the face-B copying has been completed and is to be followed by the face-A copying, the optical system must be adjusted to its start position 64, 65, 66 indicated in FIG. 18.

A feature of the present embodiment is that both-side copy can be easily effected on each sheet of copy paper and that one-side copy is automatically followed by back-side copy.

Figure 23:
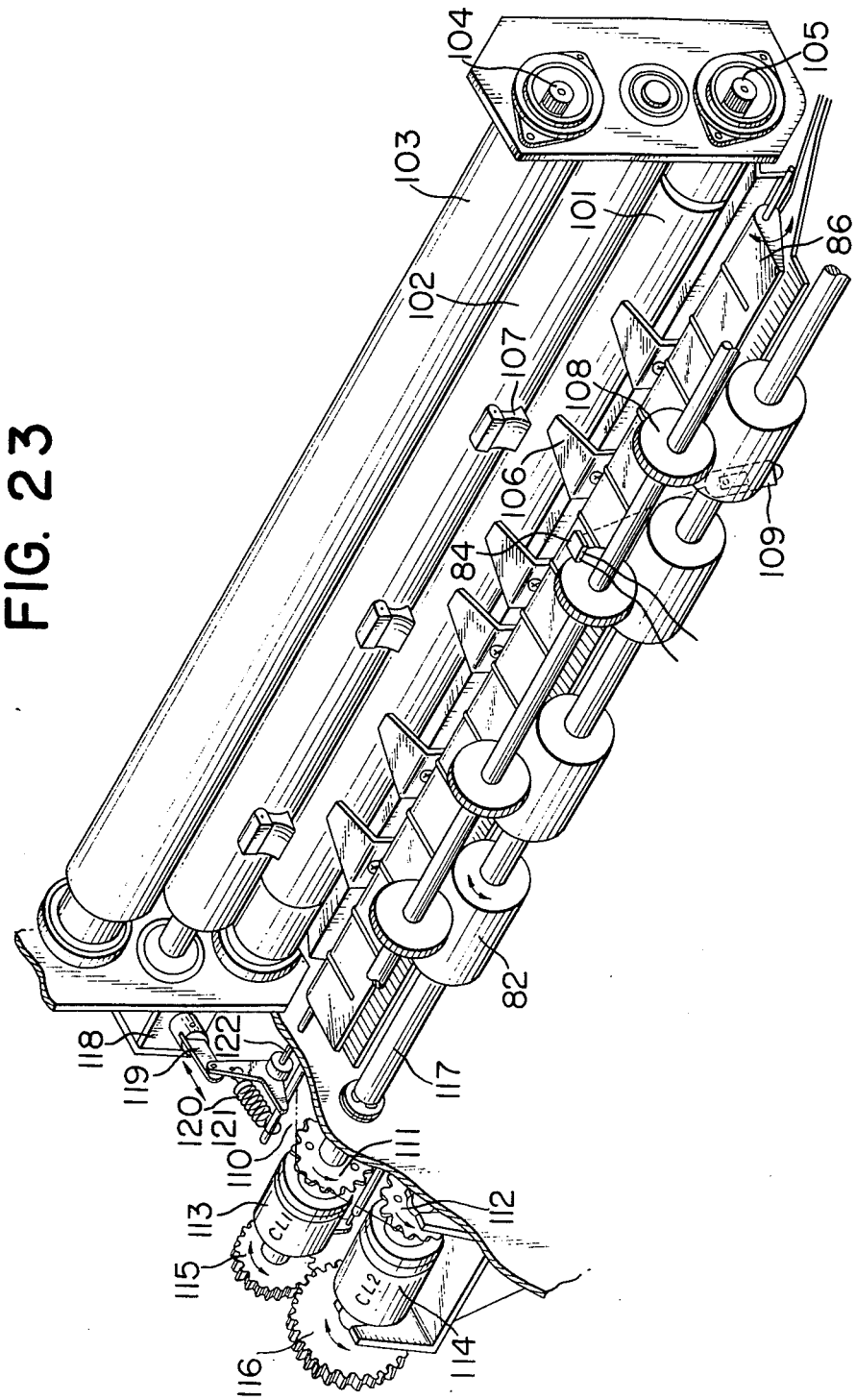
FIGS. 23 and 24 illustrate a mechanism for correcting lateral offset of copy paper for both-side copy.

Turning to FIG. 23 description will now particularly be made of the operation of a mechanism whereby the copy paper which, during one-side copy, has been passed through the fixing device 80 and conveyed through discharge rollers 82 while having any excess charge removed by the deelectrifier 83, is thereafter directed by the light-sensing element 84 when the trailing end of the paper passes such element, whereupon the discharge rollers 82 are reversed in rotation to direct the copy paper into the passage 85 for back-side copy. The fixing device 80 adopts the so-called heat roller fixing method and comprises a heater 105 as core, and a heating roller 101 freely rotatable independently of the heater 105 and covered with silicone rubber. A heating roller 102 acting as a fixing roller has a heater 104 as core, and is supplied with heat from a pressing roller 103 freely rotatably independently of the heater 104. After image transfer, the copy paper is nipped for fixation between the heating roller 101 and the fixing roller 102, and then directed to the discharge rollers 82. To prevent the fixed copy paper from coiling around the fixing roller 102 or the heating roller 101, there are provided a scraper 106 and a separator pawl 107.

How the normal and the reverse rotation of the discharge rollers 82 is effected will now be explained.

When the discharge rollers 82 are rotating in the direction of arrow A, an electromagnetic clutch 113 is in ON position while and electromagnetic clutch 114 is in OFF position, so that rotation of a sprocket 111 in the direction of arrow which is free from a paper discharge roller shaft 117 is transmitted by chain 110 and through the electromagnetic clutch 113 to the discharge roller shaft 117. To reverse the rotation of the discharge rollers 82 into the direction of arrow B, the electromagnetic clutch 113 assumes OFF position while the electromagnetic clutch 114 assumes ON position, so that the rotation of the sprocket 112 imparted in the direction of arrow by the chain 110 is transmitted to a gear 116 through the electromagnetic clutch 114, and further to a gear 115 fixed to the discharge roller shaft 117, whereby the discharge rollers 82 are rotated in the direction of arrow B.

The copy paper passed through the fixing device is conveyed by the discharge rollers 82 and follower discharge rollers 108. When the passage of the trailing end of the copy paper is electrically detected by a detecting mechanism formed by light-sensing element 84 and lamp 109 as light source, the electromagnetic clutch 113 shifts from its ON position to its OFF position while the electromagnetic clutch 114 shifts from its OFF position to its ON position, so that the discharge rollers nipping the trailing end of the copy paper are reversed in rotation. At the same time, a rockable level 121 is normally biased by a shift 120 and accordingly, the guide plate 86 (secured to a shaft 22 to which is also secured the rockable lever 121) is maintained in the position as indicated by solid lines in FIG. 18. Upon energization of a solenoid 118, the guide plate 86 is pivoted about the shaft 122 to the position as indicated by dotted lines, (In FIG. 18) so that the copy paper is directed into the passage 85 for back-side copy and stopped near the register rollers 89 by the transport rollers 87 and 88.

Figure 22:
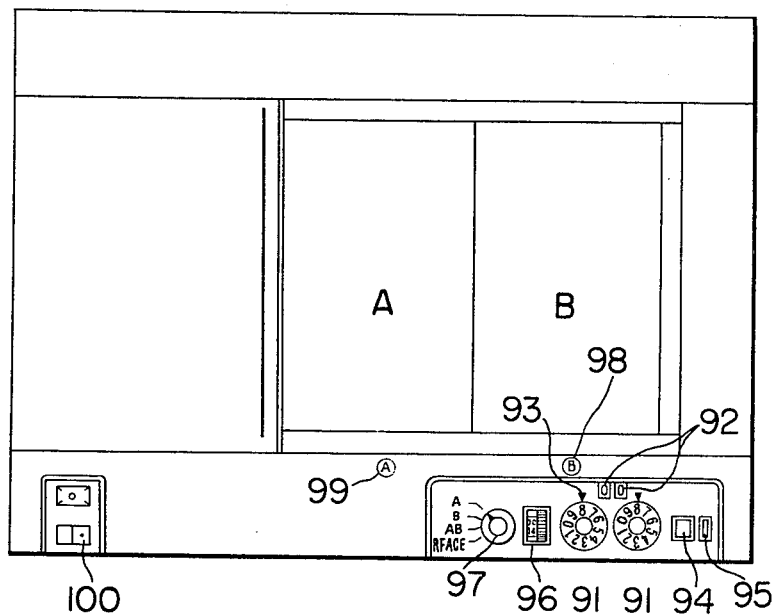
FIG. 22 is a plan view of the operating panel of the same apparatus.
Figure 21:
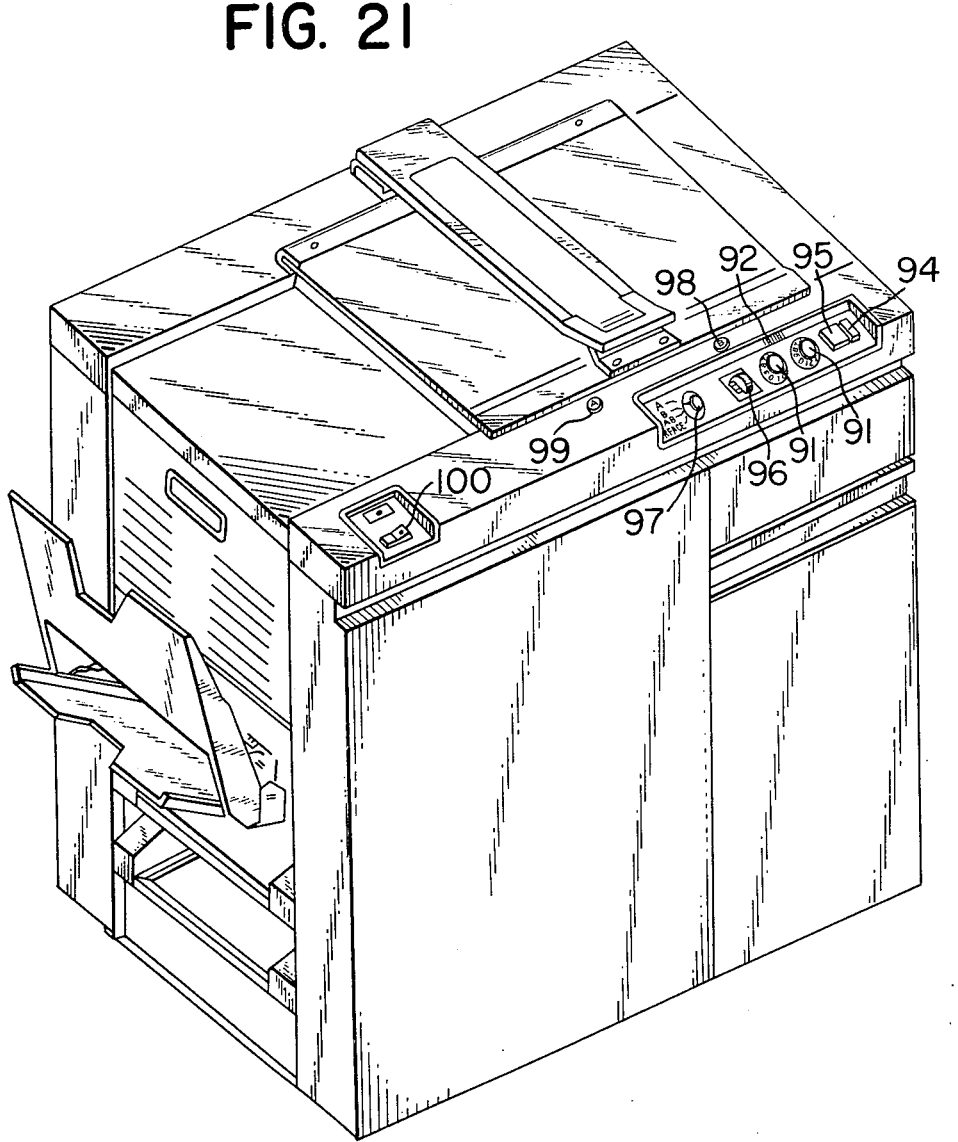
FIG. 21 is a pictorial perspective view of the same apparatus.

Copying operation of the present apparatus will hereinafter be described in detail by reference to FIGS. 21 and 22.

Designated by 100 is a main switch for operating the present apparatus. A copy number set dial 91 can set any desired number of copies from 1 to 99 by registering a desired division of the dial to the index mark. Designated by 92 is a copy number indicator tube for indicating the number of copies being produced from time to time. A copy start button 94 is provided for use when more than one sheet of copy is to be produced. When a single sheet of copy is only desired, another copy button 95 may be depressed to thereby enable only a single sheet of copy to be produced irrespective of the number indicated by the copy number set dial 91. A shade selector dial 96 is provided for determining the shade of copy image, and a copy mode selector dial 97 is provided for selecting copy modes, i.e. face-A copying, face-B copying, one-side copy, and both-side copy (faces A and B). In the mode of face-A copy, the dial 97 is set to the mark A, whereby an indicator lamp A is turned on so that only the original corresponding to the face A of the original carriage is copied. When a single copy is desired, the copy paper is not discharged onto the discharge tray but, as shown in FIGS. 5 and 6, the trailing end of the copy paper is detected by the light-sensing element 84, whereafter the copy paper is directed into the passage for back-side copy by the actions of the solenoid 118 and electromagnetic clutches 113 and 114, and then stopped at the preparatory position for face-B copying. When multiple sheets of copy are desired, the completely printed copy sheets except the last one are directly discharged onto the discharge tray 90. In the mode of face-B copying, the dial 97 is set to B, whereby an indicator lamp B is turned on so that only the original corresponding to the face B of the original carriage is copied. Irrespective of the number of copies desired, copy paper is discharged onto the tray 90 after completion of the copying. When the dial 97 is set to the mode of one-side copy, none of the indicator lamps A and B is turned on. In this mode, as in the conventional copying machines, one-side copy is possible up to size A3 and one-side printed copy sheets are directly discharged onto the discharge tray 90.

When the dial 97 is set to mode AB, the face-A copying cycle first occurs and is automatically followed by the face-B copying cycle, and after completion of the face-B copying, the copy sheet is discharged onto the discharge tray. Moreover, even if the copy number is set to a multitude, both-side copy may occur continuously.

Such a way of operation can lead to various conveniences for both-side copying. For example, both sides of an original cannot be placed on the original supporting surface at a time, as when it is desired to copy both sides of a leaf in an ordinary book. Even in such cases, the book may be opened and placed on the original carriage with the opened pages facing the respective original supporting surfaces, as when some consecutive pages of the book are to be copied, whereafter the selector dial 97 is set to the face-B copying mode so that the page then on the face B is copied on the back side of a first copy sheet, and then the copy sheet is discharged, whereafter the selector dial 97 is changed over to the face-A copying mode so that the page then on the face A is copied on the face of a second copy sheet. Subsequently, a leaf of the book is turned over and the dial 97 is reset to the face-B copying mode, so that the page then on the face B is copied on the back side of the second copy sheet, whereafter the dial 7 is again changed over to the face-A copying mode so that the page then on the face A is copied on the face of a third copy sheet. A further leaf of the book is turned over and the dial 97 is changed over to the face-B copying mode, so that the page then on the face B is copied on the back side of the third copy sheet, whereafter the dial 97 is changed over to face-A copying mode so that the page then on the face A is copied on the face of a fourth copy sheet. By continuing to copy in such a sequence, the two originals placed on the two original supporting surfaces are copied not on the opposite sides of the same copy sheet but on one side of the first copy sheet and the other side of a second copy sheet. In such case, however, it still holds true that two originals to be copied are placed on the original carriage at a time.

Further, in this case, it is necessary for the purpose of saving the operational procedures that the book be set on the original carriage with the odd-numbered page corresponding to the face A and the even-numbered page corresponding to the face B, as previously described.

Also, which page of the book being then copied corresponds to the face A or the face B can simply be known because one of face-A and face-B indicator lamps 99 and 98 disposed adjacent the faces A and B is turned on.

When two surfaces to be copied are separable and can be separately placed on the faces A and B of the original carriage at a time and if it is desired to copy them on both sides of the same copy sheet, the both-side copy may be accomplished in the manner described below.

First, a desired number of copies is set by the copy number set dial 91, and then the selector dial 97 is set to AB and the copy start button 94 is depressed, whereby both-side copy on the desired number of copy sheets may occur automatically. The fact that the both-side copy is automatically taking place may be ascertained from the fact that both of the face-A and face-B indicator lamps 99 and 98 are turned on. As described, it is a feature of the present invention that both-side copy can be accomplished without complicated operation being involved in whatever mode of both-side copy.

Figure 25:
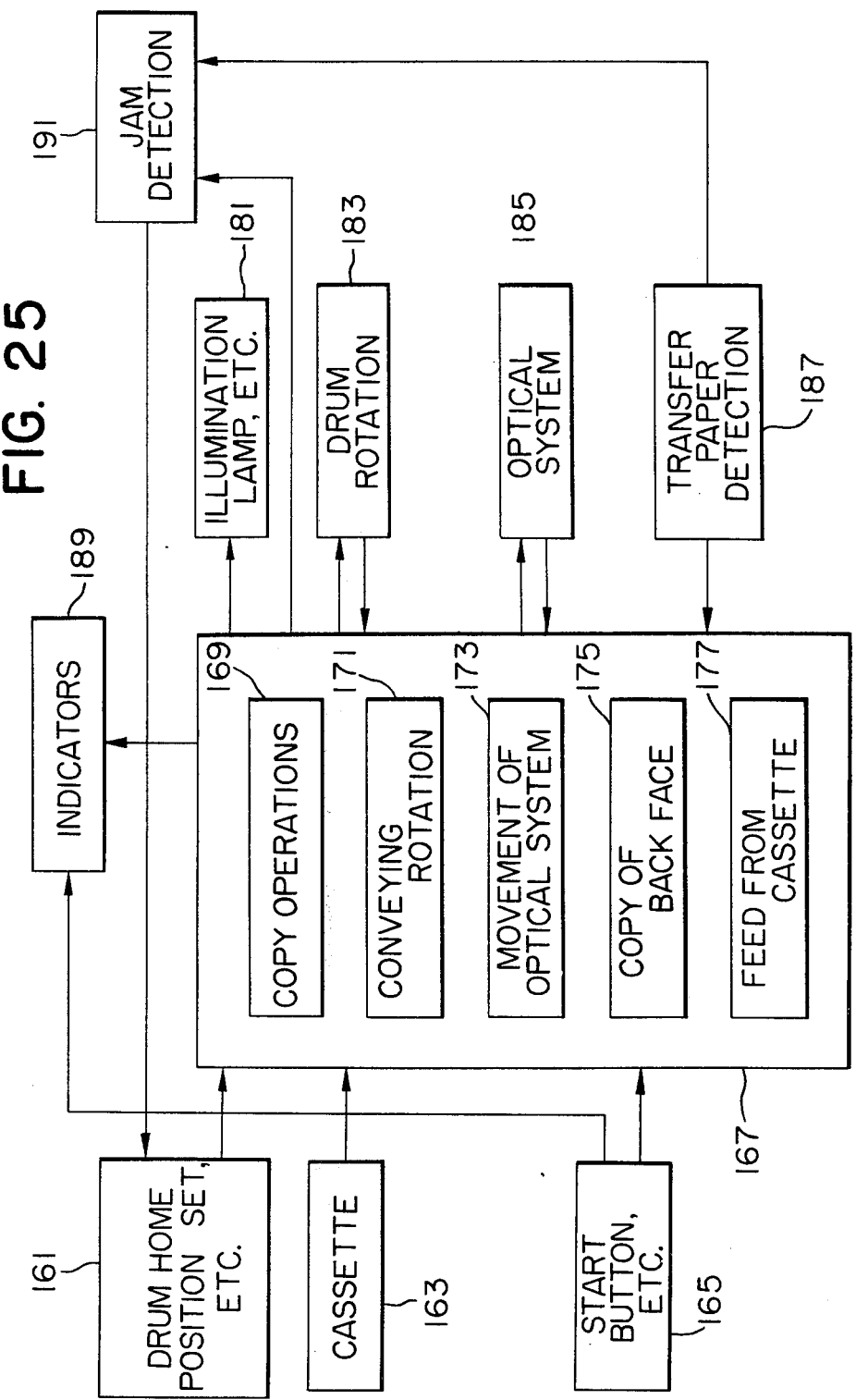
FIG. 25 is a block diagram of the electric control system in the apparatus of the present invention.

The electric control system in the present invention will now be described with respect to the present embodiment. FIG. 25 is a block diagram in which devices concerned with the control are grouped by function. The portion designated by 161 includes a drum home position set device used for closing the power source for safety devices such as power source input portion, door switch, shut-off means during occurrence of jam, and various reset devices for resetting later-described control circuits, and if required, a warm-up set device or the like. Designated by 163 is a conventional replenishment check-up device portion for checking up replenishment of cassettes, transfer paper, developer and other expendables. The portion designated by 165 includes the copy selector dial, the copy number set dial, the copy start and copy stop buttons. Signals from these portions are applied as input to a centralized control portion 167 (hereinafter referred to as "CPU") to generate operation command signals to various operating portions for copying. The CPU 167 may generally be divided into the following five portions: a portion 169 for selectively commanding various copying operations set by the signal from 105 including drum copy rotation signal; a portion 171 for generating a conveying rotation command signal required after the copy developing step; a portion 173 for generating commands for movements of the optical system, i.e. forward and backward movements and stoppage thereof; a device 175 for generating a command signal for setting transfer paper to its preparatory position for back-overall function, the preset counter further contains therewithin a zero detector circuit and an encoder for converting decimal signals into binary signals, but these are not directly related with the present invention and need not be described in detail. FIG. 27e shows a flip-flop circuit 293 which, in the embodiment of the present invention, is a D-type edge trigger flip-flop, but this is not restrictive. The function of this D-type edge trigger flip-flop is such that when a variation from low level to high level is extraneously imparted to a terminal 296, the then high-level or low-level data of an input terminal 295 is outputted and maintained. A reset input terminal 294 is provided to render the output of an output terminal 298 to low level independently of input terminals D and CP. Conversely, another input terminal 297 renders the output terminal 298 to high level. Input terminals R and S usually perform their fuctions at low level, but for simplicity, they will herein be described as performing their functions when they are at high level. An output 299 provides a level opposite to that of the output terminal 298. FIG. 27f shows a one-half frequency divider 300, which is designed such that when a variation from low level to high level is imparted to input terminal CP 301, output terminal Q 303 will produce a level variation, namely, a variation toward low level when it is at high level or a variation toward high level when it is at low level. Input terminal R serves to reset the output terminal Q 303 and is such that when high level is applied to the terminal R, the terminal Q is rendered to low level independently of the input terminal CP 301.

Figure 28:
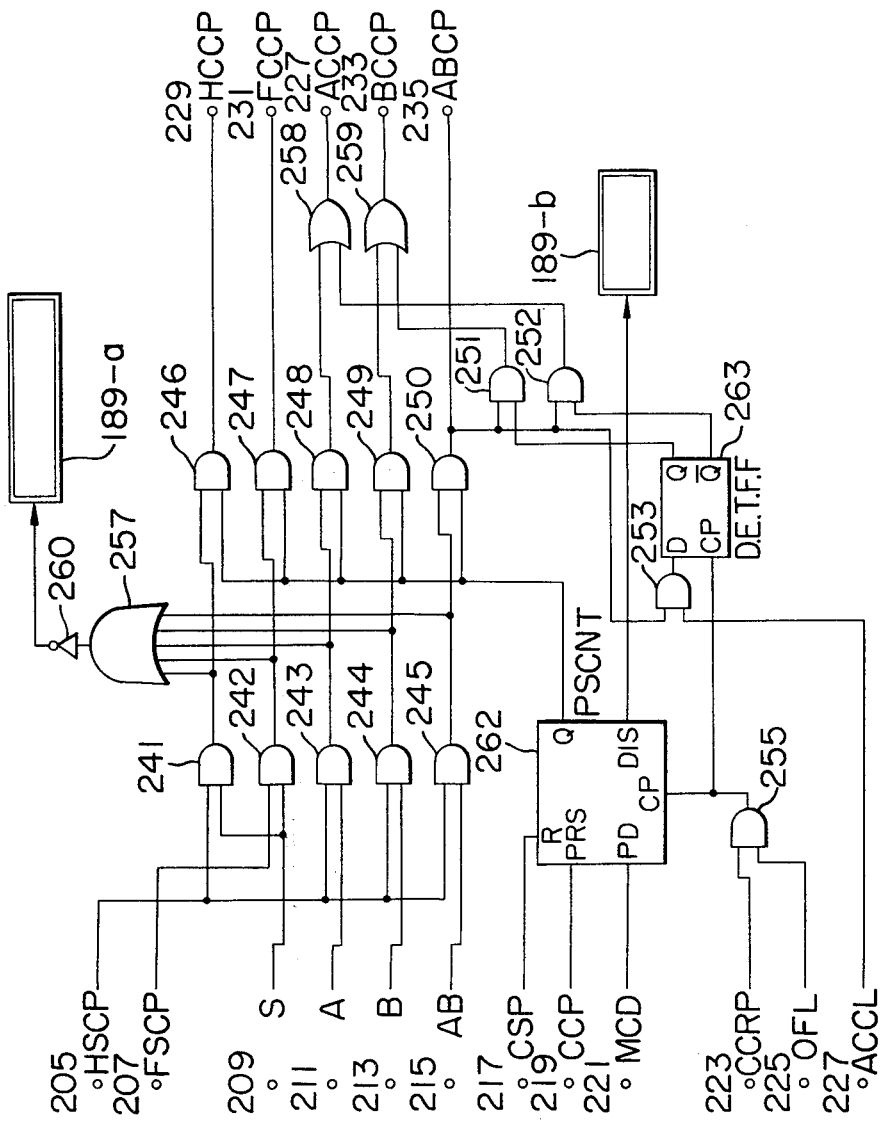
FIG. 28 is a circuit diagram of the copy selector portion.

FIG. 28a illustrates a form of the circuit for the copy selector portion 165. The modes of copying in the present invention will be classified into five types, i.e. one-side half-size copy, one-side full-size copy, both-side A copy, both-side B copy, and both-side AB copy. In cases of one-side half-size copy and both-side copy, transfer paper of half size must be fed. Here it is assumed that if the paper feed cassette is of half size, the input terminal 205 will be at high level; if the cassette is of full size, the input terminal 207 will be at high level; also, if the signal from the copy selector dial is "one-side", the input terminal 207 will be at high level; if the signal is "both-side A" or "both-side B", the terminal 213 will be at high level; if the signal is "both-side auto", the terminal 215 will be at high level and all the other terminals will be at low level. Then, the output of the AND gate 241 will be at high level when the half-size cassette signal and the one-side copy signal are both at high level, and that output will be connected to an input terminal of the AND gate 246. The output of the AND gate 242 will be at high level when the full-size cassette signal and the one-side copy signal are both at high level, and that output will be connected to the input terminal of the AND gate 247. Further, if the face-A copy signal, the face-B copy signal or the auto copy signal is at high level, the output terminals of the AND gate 243, 244 or 245 will be at high level and connected to the input terminal of the AND gate 248, 249 or 250, respectively. Thus, if the dial and the paper feed cassette are properly set before one of the described five types of copying mode is effected, one of and AND gates 241, 242, 243, 244 and 245 will be at high level. Therefore, when outputs of these gates are individually connected to the input terminals of the OR gate 267 and if there is no high-level output, the output of the OR gate will be at low level. This means that the dial and the cassette are not properly set. Therefore, by connecting the output of the OR gate 267 to the input of the inverter 260, the output of the inverter will be at high level and provide a cassette-dial checkup indicator lamp signal 189a. Next, data of the number of copies set is applied from the output terminal 221 to the terminal PD of the present counter and upon depression of the copy start button, high level enters terminal PRS from the terminal 219, whereby terminal Q of the present counter 262 will be at high level. The terminal Q maintains high level until the input pulse from terminal CP attains the same number as the number of copies set or until stop command arrives from the terminal 217. The output from the preset counter 262 is applied to the other input terminals of the AND gates 246, 247, 248, 249 and 250. Thus, in case of one-side half-size copy, the output terminal of the AND gate 246 will be at high level; in case of one-side full-size copy, the output terminal of the AND gate 247 will be at high level; in case of both-side A, the output terminal of the AND gate 248 will be at high level; in case of both-side B, the output terminal of the AND gate 249 will be at high level; or in case of both-side auto, the output terminal of the AND gate 250 will be at high level; whereby a predetermined pulse number will be applied to terminal CP of the preset counter, which will assume low level when the output Q thereof assumes low level. Thus, the output of the AND gate 246, 247, 248, 249 or 250 may be used as copy command signal for one-side half-size, one-size full-size, both-side A, both-side B or both-side auto.

The various portions perform copying operations in accordance with these copy commands, and an effective embodiment of the present invention may specifically be such as will be described below.

Although it may be somewhat redundant, description will simply be made of the rotation of the drum, movement of the optical system and timing of the paper feed required to peform the copying just in the same way as do the conventional copying machines, namely, in such a manner that when the copy selector dial selects "one-side", half-size or full-size copy is performed if the paper cassette is of half- or full-size, respectively. In FIG. 27b, there is shown a photosensitive drum 462, a drum's rotational position detecting microswitch 461, and cams 463a, 464a, 463b, 469b attached to the drum. Respective positions of the drum may be detected by the lever of the microswitch 461 being raised upwardly by those cams. The drum is rotatable in the direction of arrow 465. If the half-size copy command is generated and if the cam 463a on the drum is then at the position 461, copy rotation of the drum will be started. When the cam 404a reaches the position 461, the optical system standing at the position 195 will start to move forwardly. During such forward movement, exposure of the original occurs and, when the optical system reaches the position 198, the exposure stroke will complete and the optical system will start to move backwardly. When the backwardly moving optical system has come to the position 197, a single clock pulse is outputted to the aforesaid preset counter. The initiation of the transfer paper feed stroke will be mechanically effected when the optical system in its forward movement has come to the position 201. Therefore, if the copy performing operation corresponds, to the last one of the designated of copy sheets, the copy command will be cancelled by the time the optical system has come to the position 198. Next, when the rotation of the drum has come to the position 463b and if the side copy; and a device 177 for feeding transfer paper from said preparatory position or normally from the cassette to the transfer station. As described above, operation command signals to various operation performing portions are generated from CPU 167. As in conventional copying machines, a portion 181 includes those of the operation performing portions which do not require feedback to CPU 167, such as original illuminating lamp, high voltage source, paper feed operating portion, etc. Designated by 183 is a drum rotation operating portion which includes a drum's rotational position detector and whose signal is fed back to CPU 167. A portion 185 is also an optical system movement operating portion which includes a position detector and whose signal is fed back to CPU 167. A transfer paper detector 187 is provided at a necessary location in the path of transfer paper and generates a paper detection signal which is applied as input to CPU 167.

A jam detector 191 serves to check up normal conveyance of transfer paper and may be that utilized in conventional apparatus. The portion 189 includes various indicators and governs necessary indications on the panel.

The construction has been described briefly, and will more particularly be described chiefly about the portions pertaining to the present invention, by reference to the drawings.

In FIG. 26, numeral 195, 196, 197, 198 and 199 designate position detectors for the optical system 64 and they may comprise microswitches, but other body detectors such as light detectors or the like may also be used. Numeral 195 also means the home (or start) position for one-side copy or face-A copying, and numeral 196 also means the start position for face-B copying. Numeral 198 also means the back position for one-side half-size copying and face-A copying, and numeral 199 also means the back position for one-side full-side copying and face-B copying. Thus, for one-side half-size copying, the optical system 64 is moved forwardly from the position of the position detector 195 to the position of the position detector 198, and for one-side full-side copying, the optical system is moved forwardly from the position 195 to the position 199. For face-A copying, the movement of the optical system is the same as that in one-side half-size copying, and for face-B copying, the optical system is moved forwardly from the position 196 to the position 199. In the present embodiment, if the half-size is format A4 and the full-size is format A3, the positional relations between the various position detectors may be as follows, in order that the present invention may effectively be practised. In FIG. 26, the section corresponding to $l_1$ and the section corresponding to $l_2$ are in accord with the width of format A4. Thus, the sum $l_3$ of $l_1$ and $l_2$ is in accord with the length of format A3. If originals are placed at the positions of these respective lengths, the ranges of movement of the optical system for irradiating the originals and deriving optical image signals reflected from the original images may conveniently be a little longer than $l_1$, $l_2$ and $l_3$, respectively. More specifically, the start position 195 or 196 may preferably have a distance allowance $\alpha_1$ or $\alpha_3$ from the left end of $l_1$ (or $l_3$) or $l_2$, and the back position 198 or 199 may preferably have a distance allowance $\alpha_2$ or $\alpha_3$ from the right end of $l_1$ or $l_2$ (or $l_3$). Thus, in such case, the start position 196 and the back position 198 are respectively spaced apart by $\alpha_3$ and $\alpha_2$ leftwardly and rightwardly from the center position 200.

A copy number count signal generating device as an optical system position detector may be provided as at 197 in FIG. 26. Heretofore, such signal could be a feed command signal which will later be described, or paper detector signal produced in the passage of transfer paper, or even a siganl from other optical system position detection means or from a drum's rotational position detector. In the present embodiment, such signal may be provided by an optical system position detector means located between 196 and 198, and the subsequent operations will now be described with the signal therefrom as copy count signal. By combination of such signal and optical system forward movement performing signal, it will be only once in each process of one-side half-side copying, one-side full-size copying, face-A copying and face-B copying that both signals are generated simultaneously.

Further, in FIG. 18, numerals 84, 193 and 194 designate paper passage detector means which may comprise a pair of lamp and light-sensing element or a pair of ultrasonic wave transmitter and receiver, or the like, but for clarity, description will be made on the assumption that, in the present embodiment, the signal from such detector means is at high level during detection of paper and is at low level during non-passage of paper.

Every circuit used with the present invention is a control circuit comprising a digital logic circuit, whereas the control circuits in the present invention are not restricted thereto. Therefore, to simplify the following description, the digital logic symbols and partial circuit units will first be explained. In FIG. 27a, numeral 270 designates a positive AND gate which may have two input terminals 271 and 272 or three or more input terminals including 273 and so on. When all of the two or three or more input terminals are at high level, the output terminal 274 of the AND gate will be at high level. Whenever at least one of those input terminals is at low level, the output terminal 274 will be at low level. Next, in FIG. 27b, numeral 276 designates an inverter having an input terminal 277 and an output terminal 278 which will be at low level when the input terminal 277 is at high level and which will be at high level when the input terminal 277 is at low level. FIG. 27c shows a positive OR gate which may have two input terminals 281 and 282 or three or more input terminals including 283 and so on. When at least one of those input terminals is at high level, the output terminal 284 will be at high level. In FIG. 27d, numeral 262 designates a present counter circuit whose overall function is such that when a data signal from the preset dial is connected to an input terminal 286, a preset command signal is applied as input from an input terminal 288 to thereby set a tentative number in the interior counter. Numeral 287 designates a clock input terminal. When a pulse is applied as input from this terminal, the output of the interior counter will be the set data from the terminal 186 minus the pulse number. Numeral 291 denotes a terminal which provides a high-level output when the output of the interior counter is zero. Numeral 289 denotes a reset input terminal. When a positive pulse enters from this terminal, the set input and the output of the interior counter will both be reset to zero. There is also provided an output terminal 290 for indicating the counter output. The above-described overall function of the preset counter 262 is utilized in the circuit of the present invention. To satisfy such copy command is still present, a copy stroke will be performed just in the same way as the copy stroke which has started from the position 463a. In this case, however, it is the cam 464b that corresponds to the cam 464a.

Next, in case of full-size, the cams 463b and 464b become irrelative to each other and copying operation will always be started at the position 463a and the backward movement of the optical system will be started at the position 463a, but the other operations are similar to those in the case of half-size copy.

In the case of half-size copy and when the rotational position of the drum has come to the position 463a or 463b, or in the case of the full-size copy and when the rotational position of the drum has come to the position 463a, the drum will immediately make conveying rotation is there is no longer the copy command. During such conveying rotation of the drum, the optical system and the paper feed operation remain stopped. Also, in the absence of another copy command, the drum may unobjectionably be stopped when the cam 463a thereon has come to the position 461 at a second time excepting for the start of the conveying rotation. During that while, the last sheet of transfer paper which has executed copying will be completely discharged. In the case of one-side copy, as described, the present invention is not much different from the conventional copying machines.

Both-side copy may be carried out in the following specific manner. First, in case of both-side A copy, the copying operation is just the same as that for the half-size copy, but when no command for both-side A copy follows, the transfer paper with one side thereof printed will not be discharged during the both-side A copy performing step but directed to the preparatory position for back-side copy. Once the transfer paper has come to such preparatory position, the paper feed will start from such position irrespective of the subsequent mode of copying. Next, in case of both-side B copying, the operation differs from that in the case of one-side half-size copy in that exposure of the original occurs within the range of movement of the optical system from the position 196 to the position 199 in FIG. 26a. Irrespective of the mode of copying, and when both-side B copy command has already been outputted after completion of the forward movement of the optical system, the backward movement of the optical system will be stopped at the position 196 in preparation for both-side B copying. If the both-side B copy command has come when the optical system is at the position 195, the drum may make a half rotation of conveyance from the position 463a to the position 463b or from the position 463b to the position 463a, whereafter the drum may enter into copy rotation. During that while, the optical system may be moved forward from the position 195 to the position 196, whereat the optical system may stop in preparation for both-side B copy. Next, in case of both-side auto copy, face-A copy command is first outputted and at the next command switching point, namely after the forwardly moving optical system has passed the position 197, both-side B copy command may be outputted.

With the both-side auto copy performance resolved in the manner described above, FIG. 27a will again be referred to for describing an embodiment of the circuit. The clock pulse entering the preset counter 262 may be provided by connecting a pulse, generated at the position 197 in FIG. 25b by the movement of the optical system, to one input terminal of the AND gate 255 and connecting an optical system forward travel command (the generation of which will further be described) to the other input terminal of the same AND gate, thereby providing a signal from the output terminal thereof. The resolution of the both-side auto copy performance into both-side A copy and both-side B copy may be accomplished by the following procedures. First, the output of the AND gate 255 is further connected to the terminal CP of the flip-flop circuit 263, and face-A copy performing latch (the generation of which will further be described and which means that face-A copy is being performed) and both-side auto copy command are connected to the input terminals of the AND gate 253, of which the output is connected to the terminal D of the flip-flop 263. The output terminal Q assumes high level when, in the presence of both-side auto copy command, optical system moving forwardly during face-A copy performance has passed the position 197 in FIG. 26b, and restores low level upon output generation of the AND gate 255 resulting from the forward movement of the optical system during the subsequent face-B copy performance. Therefore, when the output from terminal Q and the output from terminal $\overline{Q}$, which provides a signal converse to the signal of terminal Q, are connected to one input terminal of the AND gate 251 and one input terminal of the AND gate 252, respectively, the outputs from the AND gates 251 and 252 may provide both-side B copy and both-side A copy commands available during both-side auto copy. In other words, when the both-side auto copy command is generated, the terminal $\overline{Q}$ of the flip-flop 263 is initially at high level and therefore, the output of the AND gate 252 assumes high level. This initially provides both-side A copy command and by this command, the face-A copy performing latch, i.e. 227, is caused to assume high level so that the terminal Q of the flip-flop 263 assumes high level during forward movement of the optical system. Thus, at this point of time, both-side B copy command is generated to cause face-A and face-B copy to be automatically performed in good order. Accordingly, by connecting the outputs of the AND gates 251 and 252 to one input terminal of the OR gate 259 and one input terminal of the OR gate 258, respectively, and by connecting the outputs of the AND gates 249 and 248 to the other input terminals of said OR gates, respectively, the outputs of the OR gates 259 and 258 may be used as both-side B and both-side A copy command signals, respectively. Thus, the terminals 229, 231, 227 and 233 in FIG. 28, when they are at high level, may provide command for one-side half-size copy, one-side full-size copy, both-side A copy and both-side B copy.

Figure 29:
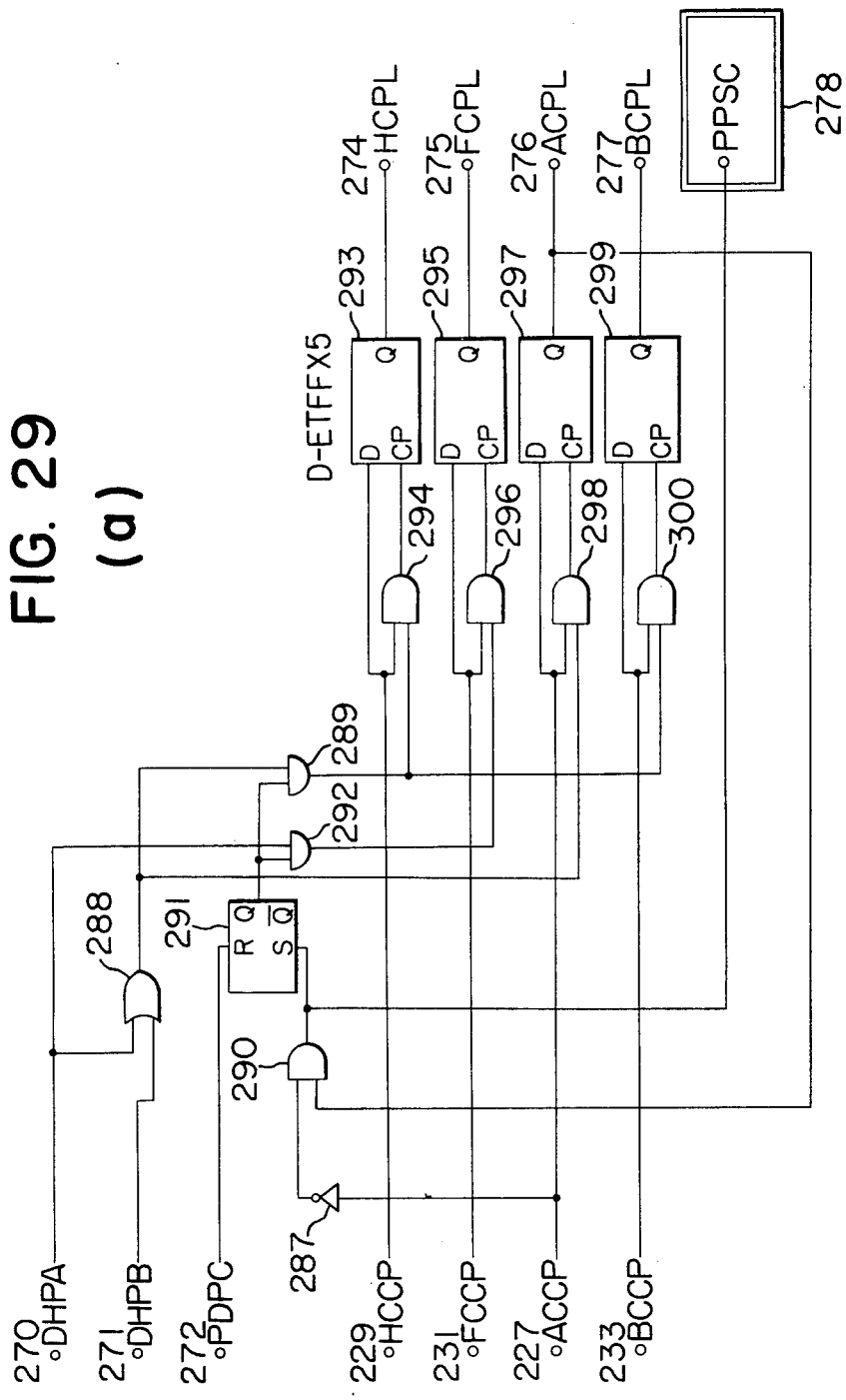
FIG. 29 is a diagram of the control circuit for controlling rotation of the photosensitive drum.

FIG. 29a illustrates an example of the circuit for controlling the rotation of the photosensitive drum. As described, copying is performed with the drum positions as shown in FIG. 26b, namely, in such a manner that the high-level output provided when cam 463a depresses the lever of microswitch 461 is the home position A of the drum and the high-level output provided when cam 463b depresses the lever of microswitch 461 is the home position B of the drum, the rotation of the drum from one home position to the next home position being the unit of drum rotation. Here, the generation process of the one-side half-size copy performing latch 274 will first be explained. The one-side half-size copy command applied as input from terminal 229 is connected terminal D of flip-flop circuit 293 and also to one input terminal of AND gate 294. Thus, when the home position signal to come to the other input terminal of AND gate 294 is already present or generated, terminal Q of the circuit 293 assumes high level and this means that the one-side half-size copy performing latch has been generated. However, if the previous copy was both-side A copy, transfer paper would be set to the preparatory position, as described, by the flip-flop circuit 273 and the AND gates 290 and 289, and therefore the home position pulse is not applied to the terminal 294 until the transfer paper is set to the preparatory position. Thus, when the both-side A copy performing latch at the output terminal 276 is at high level and the one-side A copy command is absent from the input terminal 227, the output of the AND gate 290 assumes high level and, as previously described, it is outputted as back-side copy preparatory position set command signal from the output terminal 278. The signal further enters terminal S of the circuit 291 and, as will further be described, the output thereof maintains low level at the output terminal $\overline{Q}$ until paper detection signal C (PDPC) representing the completion of the preparatory position setting is applied as input from the terminal 277. Even if that output is connected to one input terminal of each of the AND gates 292 and 289 to thereby generate a drum home position signal during the described preparatory position setting, no high-level signal enters terminal CP of the circuit 293. At this time, therefore, generation will occur after a subsequent drum home position signal has been applied as input. In this case, however, both of the drum home position signals A and B enter through OR gate 288.

Next, in case of one-side full size copy, the drum home position signal A is directly connected to one input terminal of the AND gate 292 so that the drum home position signal B becomes irrelative and generation of one-side full-size copy performing latch is effected, but in the other points the process is just the same as that in case of half-size copy performing latch, that is, entirely the same process of generation occurs with the input terminal 229, AND gates 289, 294, circuit 293 and output terminal 274 replaced by 231, 292, 296, 295 and 275, respectively.

Figure 29B:
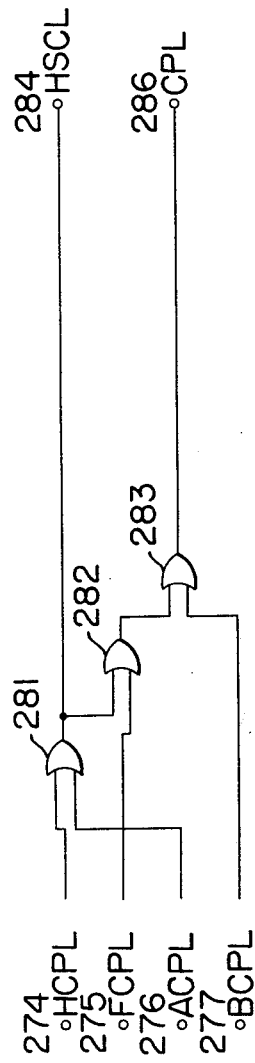
Figure 30:
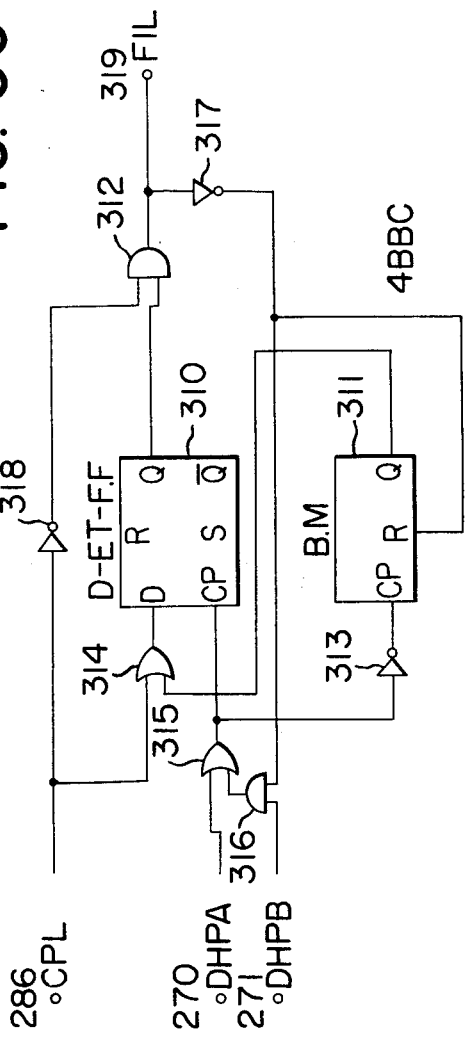
FIG. 30 is a circuit diagram of conveying rotation command (performing latch).

The generation of both-side A copy performing latch occurs just in the same process as that of one-side half-size copy performing latch, with the only exception that there is no necessity of preventing the home position signal form being applied to AND gate 298 for the preparatory position setting. Further, the generation of both-side B copy performing latch occurs entirely in the same process as that of one-side half-size copy performing latch and after all, output terminals 274, 275, 276 and 277 generate one-side half-size, one-side full-size, both-side A and both-side B copy performing latches as high level in accordance with respective copy commands. Next, as shown in FIG. 29b, the outputs from output terminals 274 and 276 are connected to the input terminals of OR gate 281, the output of which is delivered to output terminal 284 representing a copy performing latch for holding the optical system forward travel stop position at the position 198 in FIG. 26b, and is also connected to one input terminal of OR gate 282. Also connected to the other input terminal of OR gate 282 is the output from output terminal 275, and the output of OR gate 282 in turn is connected to one input terminal of OR gate 283. Connected to the other input terminal of OR gate 283 is the output from output terminal 277 and after all, the output of OR gate 283 as the copy performing latch repesenting all types of copy is delivered to output terminal 286 for utilization in the subsequent operation.

Conveying rotation command (performing latch) 171 will now be described by reference to FIG. 14. If copy performing latch CPL is at high level and copy rotation is proceeding, then this signal is applied as low level from terminal 286 through inverter 318 to one input terminal of AND gate 312. As a result, the output of AND gate 312 is rendered to low level and accordingly, conveying rotation command output terminal 319 assumes low level, thus producing no command. The output of AND gate 312 is also connected at high level through inverter 317 to AND gate 316 and terminal R of one-half frequency divider (bistable multivibrator) 311. In flip-flop circuit 310, drum home position signal is applied to terminal CP thereof, but at this time drum home position A signal (hereinafter referred to as "DHPA") is directly applied from terminal 270 to OR gate 315 while drum home position B signal (hereinafter referred to as "DHPB") is applied from terminal 271 through AND gate 316 to the other input terminal of OR gate 315, so that both signals DHPA and DHPB appear at the output of OR gate 315 when output terminal 319 is at low level, and only DHPA appears at the output of OR gate 315 and is applied to terminal CP of circuit 310 when output terminal 319 assumes high level. At the same time, this signal is also applied through inverter 313 to terminal CP of bistable multivibrator 311. The output of OR gate 314 is connected to terminal D of circuit 310, while signal CPL is connected to one input terminal of gate 314 and output Q of bistable multivibrator (hereinafter referred to as "BM") 311 is connected to the other input terminal of gate 314. When drum home position signal has risen, the time required for such signal to reach terminal CP of circuit 310 is much shorter than the time required for the signal to vary through the various gates in the circuit of FIG. 29a or 29b. Therefore, terminal 319 does not assume high level to generate conveying rotation command signal until the output Q of circuit 310 remains at high level or varies to high level upon rising of drum home position signal and CPL varies to low level upon rising of the same drum home position signal (hereinafter referred to as "DHP"). Such command is cancelled by AND gate 312 as soon as CPL assumes high level upon rising of DHP, but if CPL does not rise during conveying rotation, the command will be cancelled in the sequence described below. In such case, DHPB is not applied to terminal CP of circuit 310 by AND 316, but when the output of OR gate 315 initially rises, the reset signal of BM 311 has already assumed low level to release the reset, so that the output Q assumes high level. Thus, when a rising voltage toward high level appears at terminal CP of circuit 310, the output of OR gate 314 has assumed high level because of output Q of BM 311, in spite of the fact that CPL has already assumed low level. At this time, therefore, the output Q of circuit 310 maintains high level. Next, however, when the output of OR gate 315 varies to low level, the output Q of BM 311 also varies to low level and at the rising of subsequent DHP, the output of OR gate 314 is already at low level and accordingly, the output of circuit 310 assumes low level to cancel the conveying rotation command at the output 319.

Optical system travel command 173 will now be explained. Referring to FIG. 31, input terminals 325, 326 and 275 respectively receive the signals from drum rotation previously described in connection with FIG. 26b, namely, optical system travel start pulse A (OTSA), optical system travel start pulse B (OTSB) and one-side full-size copy performing latch (FCPL). OTSA is directly connected to one input of OR gate 335, OTSB is connected through AND gate 334 to the other input terminal of OR gate 335, and FCPL is connected through inverter 333 to the other input terminal of AND gate 334. Thus, the output of OR gate 335 produces optical system start pulse signal. However, OTSA alone is outputted in case of one-size full size copy and both OTSA and OTSB are outputted in the other cases. Input terminals 327, 328, 329 and 330 respectively receive, as inputs, the signals from optical system position detector shown in FIG. 26b, namely, optical system home position A and B signals (OHPA and OHPB) and optical system back position A and B signals (OBPA and OBPB). Also, input terminals 286, 233 and 284 respectively receive, as inputs, copy performing latch (CPL), both-side B copy command (BCCP) and half stop copy latch (HSCL). Input and output of circuit 332 will first be considered. When output Q assumes high level, it is outputted as optical system forward latch (OFL) to output terminal 344 through AND gate 340. However, the output $\overline{Q}$ of circuit 331 is connected to the other input terminal of AND gate 340 and therefore, when this output is at low level, it is blocked by the gate 340 and the output terminal 344 assumes low level and produces no output. The output $\overline{Q}$ of circuit 322 is applied as optical system backward latch (OBL) signal to output terminal 345 through AND gate 341. Terminal R receives, as input, reset signal for stopping the forward movement of the optical system and starting the backward movement thereof when output Q is at high level to permit signal OFL to be outputted through AND gate 340, that is, optical system back position signal for varying the output Q from high level to low level. As regards such optical system back position signal, however, OBPB is directly applied as input through OR gate 343, whereas OBPA is applied through AND gate 342 and by signal HSCL connected to the other input terminal thereof. Only in cases of one-side half-size copy and both-side A copy, OBPA is applied through OR gate 343. If CPL as high level is being applied from terminal 286 to terminal D of circuit 332 and when the optical system is in home position A with terminal 329 at high level or when the optical system is in home position B for both-side B copy with respective signals connected to input terminals of AND gate 336 to render this AND gate to high level, then the respective signals are connected to input terminals of OR gate 337, which thus produces high-level output. Since the output of OR gate 337 in turn is connected to an input terminal of AND gate 338, the output of OR gate 335 or optical system start pulse is now applied as clock pulse from the output terminal of AND gate 338 to terminal CP of circuit 332. Thus, output Q of circuit 332 assumes high level and is outputted as signal OFL from terminal 344 through AND gate 340. Assuming that the optical system is in home position A and that both-side B copy command signal is being applied as input, then the optical system will move forward as previously described. When the optical system reaches home position B to generate signal OHPB, AND gate 336 assumes high level. This is applied to terminal CP of circuit 321 and at this time, high level as signal BCCP is being applied to terminal D so that output $\overline{Q}$ assumes low level. Since this output $\overline{Q}$ is connected to the other input terminal of AND gate 340, the output of this AND gate is at low level and the forward command from terminal 344 is temporarily cancelled. At this time, therefore, the optical system is stopped in home position B, but a subsequent optical system travel start pulse is soon generated and applied to terminal R of circuit 331, whereupon output $\overline{Q}$ restores high level to start forward movement of the optical system. Next, when, as described, optical system back position signal corresponding to the type of copying being performed by the optical system is generated and applied from the output of OR gate 343 to terminal R of circuit 332, the output Q assumes low level to cancel the forward command. However, the output $\overline{Q}$ assumes high level and this is outputted as signal OBL through AND gate 341, so that the optical system starts backward movement. Nevertheless, the output of OR gate 337 is applied to the other input terminal of AND gate 341 through inverter 339 and so, signal BCCP assumes high level. If there is an indication that the subsequent copying is again both-side B copy, the output of OR gate 337 assumes high level when OHPB assumes high level or, in case where the both-side B copy has been completed with both-side B copy command signal (BCCP) already returned to low level, when OHPA assumes higg level, and thus the low level signal is applied from inverter 339 to AND gate 341 to cancel the backward command.

FIG. 32 shows the process in which the drum drive latch (DDL) at terminal 346 for commanding rotation of the drum is generated. As will be clear from the foregoing description, the drum rotation occurs when CPL is at high level or when conveying rotation command (FIL) is at high level. More specifically, FIL and CPL are applied as input from terminals 319 and 286, respectively, and connected to OR gate 343, the output of which generates DDL.

Figure 33:
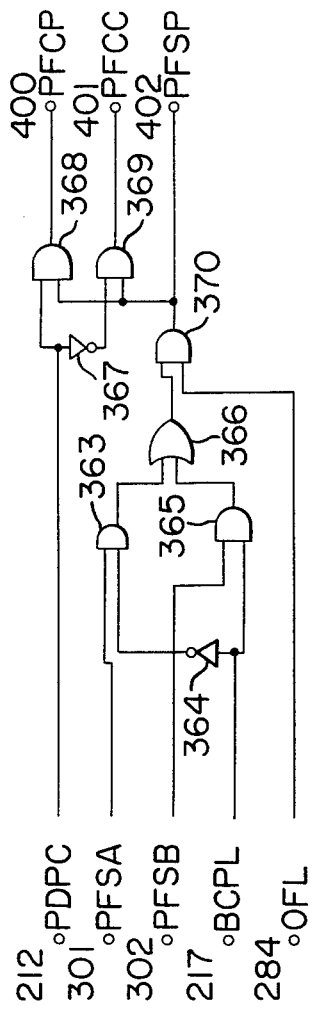
FIG. 33 is a diagram of the control circuit for controlling the feed of copy paper.

FIG. 33 illustrates the generation process of transfer paper feed command signal. First, paper detection signal C (PDPC) is applied as input to input terminal 272. This signal, as described in connection with FIG. 29a, represents completion of back-side copy preparatory position set as well as presence of transfer paper in such preparatory position. The signal PDPC will more particularly be described hereinafter. This signal is connected to one input terminal of AND gate 368 and the input terminal of inverter 367. As inputs from terminals 361 and 362, pulse signals are applied which are generated at the positions 200 and 201 by movement of the optical system, as shown in FIG. 26(b). These are arranged so as to provide paper feed timing pulse in case of one-side copy and both-side A copy and in case of both-side B copy, respectively. Also, these signals are respectively connected to one input terminal of AND gate 365. From terminal 277, both-side B copy performing latch signal is applied as input and connected to the other input terminal of AND gate 363 through AND gate 365 and inverter 364. From terminal 344, optical system forward latch signal is applied as input and connected to one input terminal of AND gate 370. Thus, during both-side B copy, signal PFSB is applied as input to OR gate 366 through AND gate 365 and during the other types of copying, PFSA is applied as input through AND gate 363. Further, the paper feed start signal outputted through OR gate 366 is connected to one input terminal of AND gate 370.

Since signal OFL is applied as input to the other input terminal of AND gate 370, signal PSFA or PFSB generated during the forward movement of the optical system is outputted from the output terminal of 361, and connected to one output terminal of AND gate 368 and one input terminal of AND gate 369. Thus, if the paper is then set to back-side copy feed preparatory position, the output from AND gate 368 will be outputted as preparatory position paper feed command to terminal 400, but if the paper is not yet set to the preparatory position, a signal as cassette paper feed command will be outputted from the output terminal of AND gate 369 to terminal 401.

Figure 34:
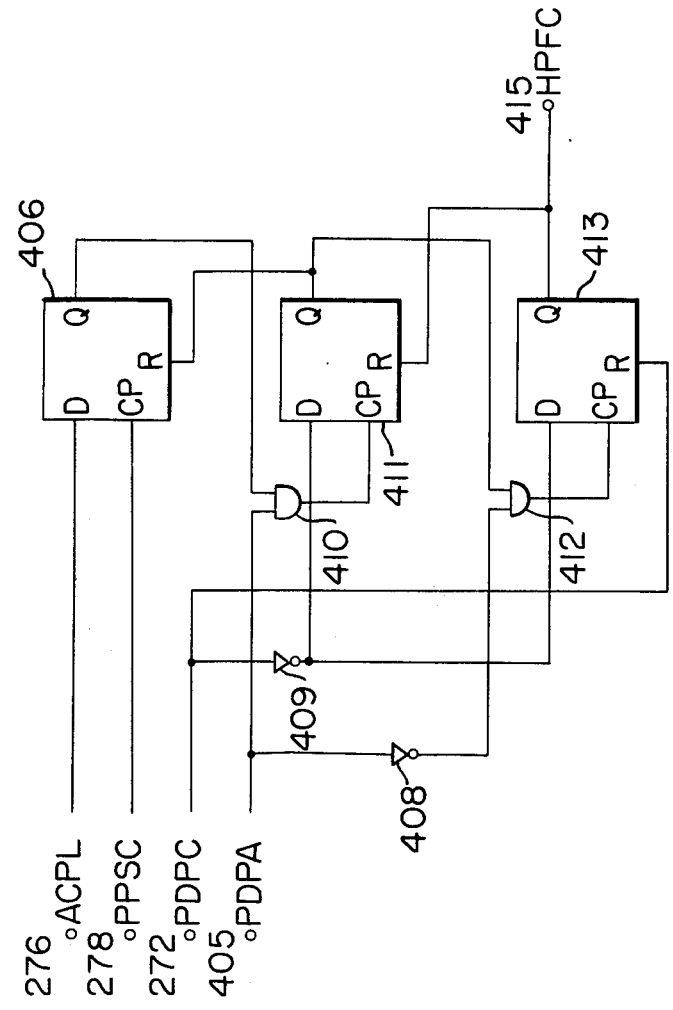
FIG. 34 is a circuit diagram of the control circuit for controlling the paper feed preparations.

Description will now be made of the process in which preparatory position command signal is generated. In FIG. 18, when preparatory position set command signal has been generated to effectively carry out the present invention (in the present embodiment, the signal is the output of terminal 278 in FIG. 29a,), transfer paper may be set to preparatory position in the process described below. When transfer paper passed through fixing device 80 is moved toward tray 90 by discharge rollers 82, passage of the transfer paper is checked up by paper detector A 84, whereafter (the transfer paper remains nipped between rollers 82) pawl 86 is moved and rollers 82 and 87 rapidly convey the transfer paper toward rollers 88, so that the leading end of the transfer paper is detected by paper detector C 194. Thereby, this high-speed preparatory position set rotation is stopped, and normal rotation of the rollers is now effected by preparatory position paper feed command so that the paper is conveyed through rollers 88 and 89 to the transfer station. However, the conveyance from the preparatory position is not restricted to the above-described method, but for example, paper detector B 193 may be provided between transport rollers 88 and 89 and paper may be conveyed to the position of such detector B 193 by high-speed preparatory position set rotation, whereafter the rotation may be stopped and paper feed may be effected by a subsequent preparatory position paper feed command. In this case, however, the timing with which paper reaches the transfer position must be invariable whether the paper feed starts from the preparatory position or from the cassette. In the present embodiment, a circuit as shown in FIG. 34 will exemplarily be described with respect to a case where high-speed preparatory position set rotation is stopped when the leading end of paper has reached the position of paper detector C 194 disposed between rollers 87 and 88, and where equality is established between the ordinary transport time required for the paper to come from that position to the rollers 88 and the time required for the paper fed from the cassette upon generation of paper feed command signal to reach the rollers 88. First, both-side A copy performing latch signal from input terminal 276 is applied as input to terminal D of circuit 406, and preparatory position set command signal PPSC from terminal 278 is applied as input to terminal CP of circuit 406. Thus, the output Q of circuit 406 remains at high level while holding the signal PPSC. This output is connected to one input terminal of AND gate 410, and signal of paper detection A rising from terminal 405 enters the other terminal of that AND gate, whereby the output thereof assumes high level and is applied as input to terminal CP of circuit 411. At the same time, signal of paper detection C is applied from terminal 272 through inverter 409 to terminal D of circuit 411 and so, the output Q of circuit 411 assumes high level if no paper is preset in the position of paper detector C. Thus, this output represents the fact tha the transfer paper to undergo both-side A copy and to be set to preparatory position is passing the paper detector A. Such output is first applied as input to terminal R of circuit 406 to reset the output Q thereof, and also connected to one input terminal of AND gate 412. Therefore, when the transfer paper has passed the paper detector A and signal PDPA has assumed low level, that signal as the signal rising to high level is connected through inverter 408 to the other input terminal of AND gate 412. The output of this gate is then applied as input to terminal CP of rising circuit 413. At the same time, signal PDPC is applied through inverter 409 to terminal D of circuit 413, so that the terminal D assumes high level and accordingly, the output Q assumes high level and is outputted from terminal 415 as high-speed preparatory position set rotation command (HPFC). At this time, circuit 411 is reset by its terminal R receiving the output of circuit 413. Next, when the transfer paper reaches the position of paper detector C, signal PDPC assumes high level and is applied as input to terminal R of circuit 413 to reset the output Q thereof and thereby cancel the signal HPFC.

An example of the electric control circuit used in practising the present invention has hitherto been described, but the following matters have been omitted in the foregoing description for simplicity. One of them is that the output of each flip-flop is temporarily reset when power source is connected and that chuttering preventing circuit is employed to prevent any chuttering which would otherwise result from the use of contact type switching elements such as microswitches during generation of detection signal in each position detector. Driving circuits for the various devices driven in accordance with various commands have also been omitted in the foregoing description. Further, the control circuits in the present invention are never restricted to those described herein.

When back-side copy cycle is entered after completion of one-side copy, copy paper may sometimes be offset from its predetermined position. It is therefore necessary to relocate such copy paper to its predetermined position and convey it for back-side copy. A mechanism for correcting such lateral offset of copy paper will now be described.

After completion of one-side copy and completion of development and fixation thereof, the trailing end of the copy paper is detected as by light-sensing element 84 and light source 109 in FIG. 18. Thereby, electromagnet clutch 113 shifts from ON position to OFF position and the movement of the paper is temporarily stopped. In the discharge roller portion, the copy paper might sometimes by laterally offset with respect to its direction of movement and thus, it is necessary to check up the presence of such lateral offset and correct it properly before the back-side copy process. For this purpose, the present apparatus employs a lateral offset correcting mechanism as shown in FIGS. 23 to 24.

Figure 24:
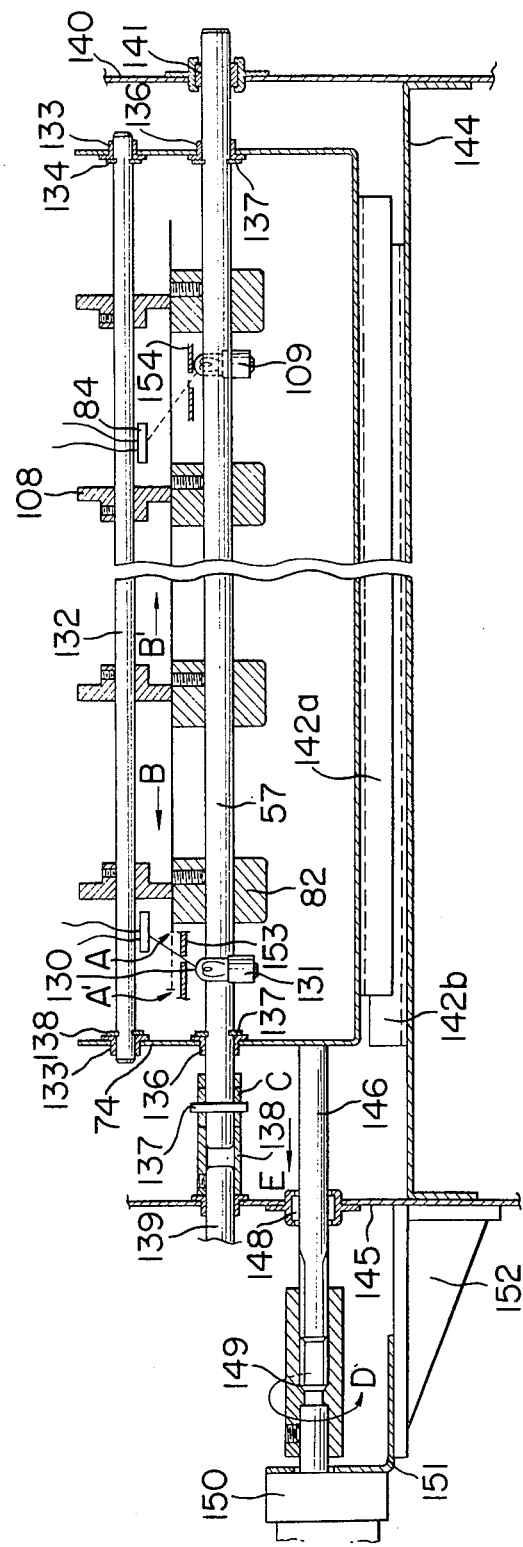

At the stage whereat, as previously mentioned, the movement of the copy paper has been temporarily stopped with the electromagnetic clutch 113 shifted to OFF position, the copy paper must be moved in the direction of arrow B in FIG. 24 until one side edge A of the paper comes to the optical axis between 131 and CdS 130 so that the lateral offset of the paper with respect to its direction of movement may be corrected with the aid of CdS 130 and lamp 131. Conversely, if the paper lies with its side edge situated as indicated by dotted-line arrow A', the paper must be moved in the direction of arrow B' until that side edge of the paper is aligned with the optical axis between CdS 130 and lamp 131, whereupon the paper must be stopped, thus accomplishing the correction of lateral offset of the paper.

Such lateral offset correctig mechanism will now be described by reference to FIG. 24.

There are seen discharge rollers 82 and follower discharge rollers 108. Follower rollers 108 are secured to a follower roller mounted shaft 132 by screws. The mounting shaft 132 is rotatably supported by bearings 133 which are secured to discharge roller mounting base plate 134. The shaft 132 is positioned by clamping washers 135 against movement in thrust direction. On the other hand, discharge rollers 82 are secured to discharge roller shaft 117 by screws, and the shaft 117 is rotatably supported by bearings 136. The shaft 117 is positioned by clamp washers 137 against movement in thrust direction with respect to the mounting plate 134. Pins 137 are studded in the shaft 117 and engaged in slots C for movement in thrust direction, which slots are formed in collars 138 movable in thrust direction with respect to shaft 117. The collars 138 are securely fixed to shaft 139 as by screws, and the shaft 139 is secured to gear 115 (FIG. 23). The other end of the shaft 117 is supported by slide bearing 141 for movement in thrust direction, which bearing is mounted in a side plate of the apparatus body. The mounting base plate 134 in its lower portion is securely connected to a portion of slide rail 142a, which in turn is slidably connected to another slide rail 142b by means of steel balls 143. The slide rail 142b is secured to mount plate 144, which in turn is secured to side plates 140 and 145 of the apparatus body. Shaft 146 is secured to the mount plate 134 as by caulking, and supported by slide bearing 148 for movement in thrust direction, which slide bearing is mounted in side plate 134 of the apparatus body. The other end of the shaft 146 is externally threaded. Collar 149 is formed with an internally threaded portion for engagement with the externally threaded portion of shaft 146, and has one end secured to the shaft of reversible motor 150. The reversible motor 150 is fixed to motor mount plate 151, which in turn is fixed to a base 152 mounted to side plate 145 of the apparatus body. (It is to be noted that rotation of collar 149 in the direction of arrow will cause shaft 146 to be moved in the direction of arrow E.)

Lamp 131, CdS 130 and slit 153 for stopping down the optical axis to permit the paper to be stopped with its side edge exactly in its predetermined position are all secured to side plate 145 of the apparatus body as by mount plate. A slit 154 is also provided for stopping down the optical axis between CdS 84 and lamp 109. Lamp 109 and CdS 84 are secured to side plate 140 of the apparatus body as by mount plate, and slit 154 is secured to mount plate 134.

Operation of the correcting mechanism will now be explained. In FIG. 24, when the movement of paper is stopped with its side edge in the position A, the reversible motor 150 continues to operate with the aid of the later-described function of the paper side edge detecting mechanism provided by CdS 130 and 131, to cause the collar 149 to be rotated in the direction of arrow D till the movement the side edge of the paper passes the optical axis between lamp 131 and CdS 130, whereupon the motor momentarily stops its operation. If, in FIG. 24, the paper is stopped at the position of dotted-line A (namely, the position past the optical axis between lamp 131 and CdS 130), the collar 149 will now be rotated in the direction opposite to that of arrow D and the shaft 146 moved in the direction opposite to that of arrow E again by the paper side edge detecting mechanism till the moment the paper side edge passes the optical axis between CdS 130 and lamp 131, whereupon the motor will momentarily stop its operation. When the side edge of the paper comes to its regular position, electromagnetic clutch 114 shifts from OFF position to ON position to cause discharge rollers nipping the trailing end of the copy paper to be rotated in reverse direction. At the same time, pivotable lever 121 is normally biased by spring 120 and accordingly, guide plate 86 (secured to shaft 122 to which the pivotable lever 121 is secured) is also maintained in the solid-line position indicated in FIG. 18. Upon energization of solenoid 118, the guide plate 86 is pivotally displaced about shaft 122 to the position indicated by dotted lines in FIG. 18, so that the copy paper is directed to the passage 85 for back-side copy and stopped near register roller 89 by transport rollers 87 and 88.

After the paper has completely passed through the discharge rollers and until the light from lamp 109 impinges on CdS 84 or until the slit 154 returns to its regular position (the position shown in FIG. 24), the reversible motor operates in the direction opposite to the direction in which the mount base plate 134 has first been moved for the detection of the paper side edge (e.g. the direction E), and the motor is stopped at the moment the light from lamp 109 is detected by CdS 84. The above-described correction of lateral offset of the paper also lends to obviation of the image on the copy paper from being laterally offset with respect to the original image.

Figure 35:
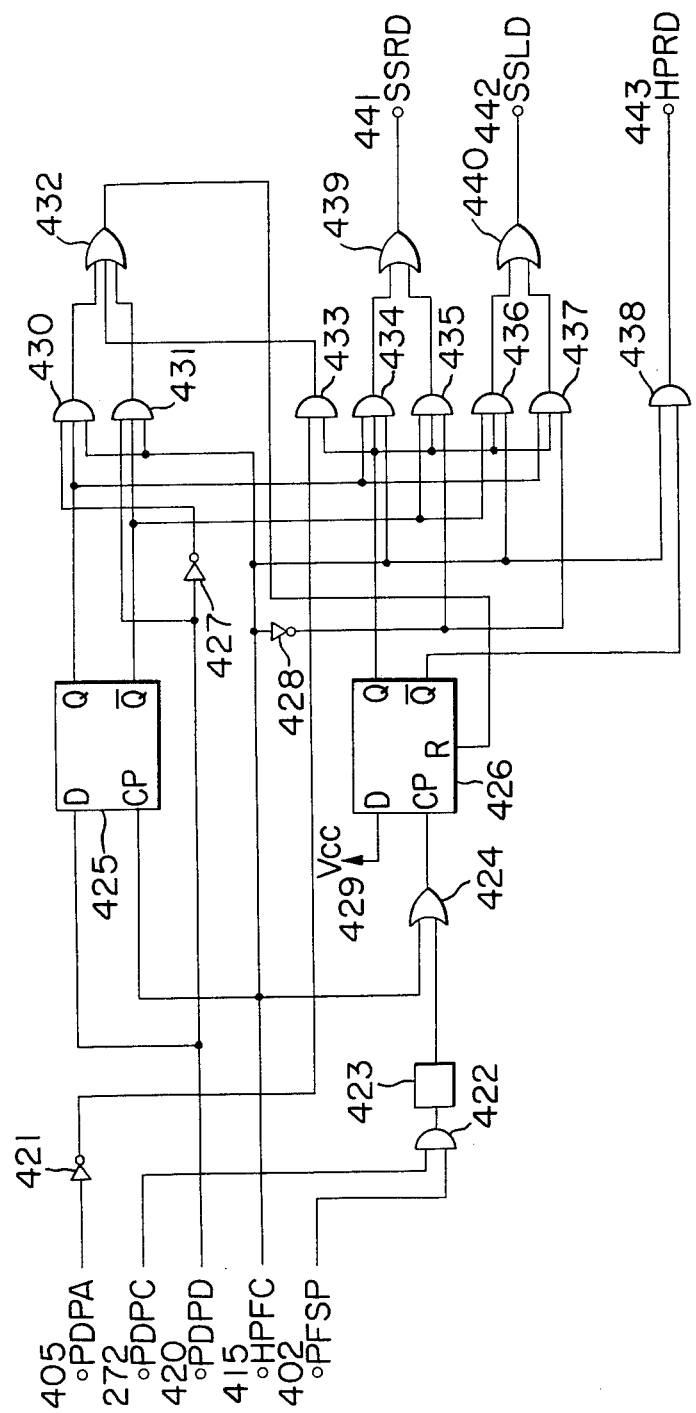
FIG. 35 is a diagram showing an example of the contril circuit for correcting lateral offset of copy paper.

An example of the control circuit for the correction of lateral offset will hereinafter be described by reference to FIGS. 27 and 35. When copy paper has been stopped while being nipped by discharge rollers 82 and 108 and if no paper is detected by paper detector D 130 (which, in the present) embodiment, comprises CdS 130, lamp 131 and shield plate 153 and will hereinafter be referred to as "paper detection D 130"), then reversible motor 150 will be driven by the lateral offset correction control circuit so as to move rollers 82 and 108 in the direction of arrow E in FIG. 24. If the presence of copy paper is detected, the reversible motor will be driven so as to move those rollers in the opposite direction. In any case, at the moment paper has been detected or at the moment paper has not been detected, the reversible motor 150 stops its rotation and thereafter, resumes and continues its rotation until preparatory position performing command (HPFC) is cancelled by high-speed rotation of rollers 82 and 87, whereby the copy paper is conveyed by a subsequent signal, i.e. preparatory position paper feed command. After the lapse of time more than the time from generation of the paper feed signal till the trailing end of the longest paper sheet available for use with the present copying machine passes the position of paper detector A, reversible motor 150 is again driven so that the rollers 82 and 108 moved for the correction of lateral offset are returned to their original positions. In the present embodiment, however, the predetermined position is the position to which the shield plate 154 in the paper detector A 84 which has once intercepted the light from lamp 109 due to lateral movement of rollers 82 and 108 is returned to permit the light from lamp 109 to be again detected by CdS 84. In FIG. 35, which shows the lateral offset correction control circuit, signal from paper detector D 130 (hereinafter called "HPFC") is connected from terminal 420 to terminal D of flip-flop 425, and preparatory position performing command (HPFC) is connected from terminal 415 to terminal CP of flip-flop 425. Therefore, when terminal $\overline{Q}$ assumes high level, it outputs a signal showing that reversible motor 150 should operate to move the rollers 82 and 108 in the direction of arrow E in FIG. 24 for the correction of lateral offset, and when terminal Q assumes high level, it outputs a signal showing that the reversible motor should operate to move the rollers in the opposite direction.

Flip-flop circuit 426 is such that its output terminal Q produces high-level output for the time during which reversible motor 150 should be rotated irrespective of its rotational direction. When terminal D is connected to power source and rising signal is applied to terminal CP, a high-level signal appears at terminal Q. The correction of lateral offset is initiated in the following manner. The rising signal of HPFC entering from terminal 415 is applied through OR gate 424 to terminal CP of flip-flop circuit 426 to render the output terminal Q thereof to high level. At this time, flip-flop circuit 425 memorizes whether or not the copy paper has been detected by paper detector D 130. If the copy paper has not been detected, namely, if the output $\overline{Q}$ of flip-flop circuit 415 is at high level, AND gate 436 satisfies the conditions that signals at Q and $\overline{Q}$ of flip-flop circuits 625 and 626 and signal HPFC be all at high level, and lateral leftward (direction E in FIG. 24) movement command signal is outputted as SSLD from terminal 442 through OR gate 440, and such control signal devices the reversible motor. If the copy paper has been detected by paper detector D 130, the output Q of flip-flop circuit 425 assumes high level and is connected to one input terminal of AND gate 434 with the two other input terminals thereof being entirely in the same condition, and the output terminal of this AND gate produces lateral rightward movement command signal, which is outputted as SSRD from terminal 441 through OR gate 439 to drive the reversible motor 150 in the reverse direction. Next, when the copy paper is moved laterally leftwardly, for example, and detected by the paper detector D 130, signal PDPD from terminal 420 rises. This signal is connected to one input terminal of AND gate 431 and, at this time, the output terminal $\overline{Q}$ of flip-flop circuit 425 and HPFC are at high level and connected to the two other input terminals of AND gate 431, so that the signal at the output terminal of this AND gate rises now. This signal is connected through OR gate 432 to terminal R of flip-flop circuit 426, so that the circuit is now reset with its output terminal Q rendered to low level, and accordingly, the output SSLD is rendered to low level through AND gate 436 and OR gate 441, thus stopping the lateral leftward movement. If the copy paper during lateral rightward movement has come not to be detected by paper detector D 130, signal PDPD is rendered to low level and inverted by inverter 427 to a high-level rising signal, which in turn is applied to one input terminal of AND gate 430. The two other input terminals of AND gate 430 are entirely the same as those of AND gate 431. Thus, the output of AND gate 430 rises to reset flip-flop circuit 426 through OR gate 432, whereby the signal from terminal Q of flip-flop 426 lowers and accordingly, signal SSRD is lowered through AND gate 434 and OR gate 439, thus stopping the lateral rightward movement.

The sequence of operations for the return to the predetermined position will now be described. When signal PDPC from paper detector C applied as input through terminal 272 is at high level, namely, when copy paper is present at the preparatory position, paper feed timing pulse PFSP is generated as described, whereupon the output terminal of AND gate 422 produces a pulse because signals PDPC and PFSP are respectively connected to the input terminals of this AND gate. This output is applied to timer device 423, which outputs a pulse with a predetermined time delay, and the pulse is applied through OR gate 424 to terminal CP of flip-flop circuit 426, whose output terminal Q assumes high level again. At this point, as previously described, signal HPFC has already been rendered to low level and the signal rendered to high level through inverter 428 has already been applied to one input terminal of each AND gate 435, 437. Thus, when the output terminal $\overline{Q}$ of flip-flop circuit 425 is at high level, namely, when rollers 82 and 108 are being moved leftwardly by the above-described sequence, this output is being applied to one other input terminal of AND gate 435, and when the output Q of flip-flop circuit 426 has come to high level, this output is applied to one other input terminal of AND gate 435, so that the output of this AND gate rises and SSRD again rises through OR gate 439, thus initiating the lateral rightward movement. By this movement, the rollers reach the predetermined position (at this time, as described, in the paper detector A 84, the light from lamp 109 once intercepted by the shield plate 154 can again impinge on CdS 84), and lowered signal of PDPA from input terminal 405 is applied, whereupon the high-level signal through inverter 421 is applied to one input terminal of AND gate 433, of which the other input terminal is then receiving high-level Q output of flip-flop circuit 426, so that the high-level signal from the inverter 421 is applied through OR gate 432 to terminal R of flip-flop circuit 426, which is thus reset to render its output Q to low level and accordingly, SSRD is lowered through AND gate 435 and OR gate 439. When the output Q of flip-flop circuit 425 is at high level, SSLD rises through AND gate 437 and OR gate 440 to move the offset rollers leftwardly to their predetermined position, whereupon SSLD assumes low level just in the same way as described, thus stopping the reversible motor 150. At this time, when the copy paper has passed the paper detector A 84 due to high-speed preparatory position set and preparatory position paper feed signals, and if the rollers 82 and 108 remain in their predetermined positions with little or no amount of movement for the correction of lateral offset, then the signal PDPA is lowered. Thus, even if paper feed timing pulse is produced and the timer device applies delayed pulse to the terminal CP of flip-flop circuit 426 to cause its output Q to rise, such rising signal is at that moment applied through AND gate 433 and OR gate 432 to the terminal R of circuit 426, the output Q of which immediately restores low level, whereby lateral movement command SSRD or SSLD is not generated.

Although the invention has been described in its preferred form with a certain degree of particularly, it is understood that the present disclosure of the preferred form has been changed in the details of construction and the combination and arrangement of parts may be restored to without departing from the spirit and the scope of the invention as hereinafter claimed.

We claim:
1. A copying apparatus comprising:
an original carrier having a surface defining first and second contiguous areas for retaining thereon an original corresponding dimensionally to the combined area of two surfaces of a desired copy size;
a photosensitive member;
optical scanning means for scanning the entire area of the original by sequentially scanning the portions of the original retained respectively on said first and second contiguous carrier areas as said scanning means transverses first and second portions of an elongated scanning path, wherein each of said portions extends across one of said contiguous areas;
means for forming an electrostatic image of the original on said photosensitive member;
means for developing the electrostatic image;
means for transfering the portions of developed image defined by the first and second portions of the scanning path onto separate copy material surfaces; and
means for feeding copy material to said transferring means.

2. An apparatus according to claim 1, wherein said transferring means transfers said portions of the developed image onto respective sides of a single copy material.

3. An apparatus according to claim 1, wherein said transferring means transfer said portions of the developed image respectively onto separate copy materials.

4. An apparatus according to claim 1, wherein said original carrier is movable along said first and second portions of the scanning path to scan the original.

5. An apparatus according to claim 1, wherein said scanning means includes mirror means movable along said first and second portions of the scanning path to scan the original.

6. An aparatus according to claim 1, further including means for discharging copy material, and wherein said feeding means includes a cassette, means for holding the cassette, and movable guide means connected between the holder means and body of the copying apparatus to permit said cassette to be moved from a feeding position to a discharge position adjacent said discharging means.

7. An apparatus according to claim 1, including means for selectively operating said apparatus in a first mode wherein the portions of the developed image provided by the first and second portions of the scanning path are transferred onto respective sides of a single copy material, and in a second mode wherein the portions are transferred onto different copying materials.

8. An apparatus according to claim 1, wherein said optical scanning means includes an exposure slit, and wherein said scanning means, after traversing the first portion of the scanning path, moves back a distance at least equal to the width of the exposure slit prior to transversing the second portion of said elongated scanning path.

9. An apparatus according to claim 1, wherein said copying material feeding means includes two feeders, one for feeding material for copying on a first side thereof, and the other for feeding material for copying on the reverse side, and wherein the feeder for reverse side copying includes means for correcting any lateral offset of a copy medium with respect to its direction of movement prior to being fed for copying on its reverse side.

10. An apparatus according to claim 1, further including means for discharging copy material, wherein said copy feed means includes first and second feeders, first movable guide means connected between the first feeder and the body of the copying apparatus to permit said first feeder to be moved between a discharge adjacent said discharge means and a feeding position, and second movable guide means connected between the second feeder and the body of the copying apparatus to permit said second feeder to be moved to and from said feeding position, and wherein two-sided copying is achieved by first positioning the first feeder at the discharge position and the second feeder at the feeding position so that a copy material having an image on a first side is discharged into said first feeder, and then moving said first feeder to said feeding position for copying on the reverse side of the copy material.

11. An apparats according to claim 1, further comprising means to prepare a copy material for carrying out reverse side copying after a first copying operation has been completed.

12. An apparatus according to claim 11, wherein said preparation means includes means for detecting a trailing end of a copying material having a transferred image on a first side thereof, a discharge roller having means to reverse the rotation of said discharge roller in accordance with an output signal from said detecting means, and means for guiding said copying material from said discharge roller to a register roller for feeding said copy material to receive an image on its reverse side.

13. A copying apparatus comprising:
an original carrier having a surface defining first and second contiguous areas for retaining thereon an original corresponding in dimension to the combined area of two surfaces of a desired copy size;
a photosensitive member;
optical scanning means for scanning the entire area of the original by sequentially scanning the portions of the original retained respectively on said first and second contiguous carrier areas as said scanning means transverse first and second portions of an elongated scanning path, wherein each of said portions extends across one of said contiguous areas;
means for forming an electrostatic image of that portion of the original retained on said first carrier area on one side of the photosensitive member and forming an electrostatic image of the remainder of the original on the reverse side of the photosensitive member;
means for developing an electrostatic image; and
means for feeding and conveying the photosensitive member through said image forming means and said developing means.

* * * * *

UNITED STATES PATENT AND TRADEMARK OFFICE
CERTIFICATE OF CORRECTION

PATENT NO. : 4,017,173
DATED : April 12, 1977
INVENTOR(S) : SHIGEHIRO KOMORI, HISASHI SAKAMAKI, MASAO ARIGA, HIROSHI NITANDA, SEIGI NAGASAWA It is certified that error appears in the above-identified patent and that said Letters Patent are hereby corrected as shown below:

Column 1, line 19, after "each" insert --copy--;

line 57, change "cases" to read --case--.

Column 3, line 29, delete "tril" and insert --trol--;

line 54, change "drym" to read --drum--.

Column 4, line 25, change "coping" to read --copying--;

line 32, change "tble" to read --table--.

Column 7, line 12, change "face-a" to read --face-A--.

Column 8, line 42, change "power" to read --powder--.

Column 10, line 23, delete "and" and insert --an--;

line 48, change "level" to read --lever--;

line 49, delete "shift 120" and insert --spring 120--;

line 50, delete "22" and insert --122--.

Column 14, line 8, change "siganl" to read --signal--;

line 17, change "half-side" to read --half-size--;

line 51, change "present" to --preset--;

line 59, change "186" to read --286--.

UNITED STATES PATENT AND TRADEMARK OFFICE
CERTIFICATE OF CORRECTION

PATENT NO. : 4,017,173
DATED : April 12, 1977
INVENTOR(S) : SHIGEHIRO KOMORI, HISASHI SAKAMAKI, MASAO ARIGA, HIROSHI NITANDA, SEIGI NAGASAWA It is certified that error appears in the above-identified patent and that said Letters Patent are hereby corrected as shown below:

Column 16, line 6, change "present" to read --preset--;

lines 8 & 9, change "present" to read --preset--;

line 65, after "designated" insert --number--.

Column 17, line 17, change "is" (first occurrence) to read --if--;

line 43, change "26a" to read --26b--;

line 68, change "25b" to read --26b--.

Column 19, line 49, change "form" to read --from--.

Column 20, line 14, change "at" to read --as--;

line 52, after "AND" insert --gate--.

Column 21, line 12, change "one-size" to read --one-side--;

line 31, change "322" to read --332--;

line 68, change "321" to read --331--.

Column 22, line 27, change "higg" to read --high--.

Column 23, line 5, change "output" to read --input--.

UNITED STATES PATENT AND TRADEMARK OFFICE
CERTIFICATE OF CORRECTION

PATENT NO. : 4,017,173
DATED : April 12, 1977
INVENTOR(S) : SHIGEHIRO KOMORI, HISASHI SAKAMAKI, MASAO ARIGA, HIROSHI NITANDA, SEIGI NAGASAWA It is certified that error appears in the above-identified patent and that said Letters Patent are hereby corrected as shown below:

Column 24, line 3, change "tha" to read --that--;

line 52, change "magnet" to read --magnetic--;

line 55, change "by" to --be--;

line 66, after "between" insert --lamp--.

Column 25, line 9, change "correctig" to read --correcting--;

line 13, change "mounted" to --mounting--.

Column 26, line 35, change "lends" to read --leads--;

line 43, delete ")" after "present";

line 45, change "detection" to read --detector--.

Column 27, lines 36 & 37, change "devices" to read --drives--.

Column 29, line 17, change "transverses" to read --traverses--;

line 35, change "transfer" to read --transfers--;

line 44, change "aparatus" to read --apparatus--.

Column 30, line 1, change "transversing" to read --traversing--;

UNITED STATES PATENT AND TRADEMARK OFFICE
CERTIFICATE OF CORRECTION

PATENT NO. : 4,017,173
DATED : April 12, 1977
INVENTOR(S) : SHIGEHIRO KOMORI, HISASHI SAKAMAKI, MASAO ARIGA, HIROSHI NITANDA, SEIGI NAGASAWA It is certified that error appears in the above-identified patent and that said Letters Patent are hereby corrected as shown below:

Column 30, line 17, after "discharge" insert --position--;

line 53, change "transverse" to read --traverses--;

line 59, after "and" insert --for--.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*